(12) United States Patent
Kim et al.

(10) Patent No.: US 12,074,362 B2
(45) Date of Patent: Aug. 27, 2024

(54) ELECTRONIC DEVICE COMPRISING ANTENNA

(71) Applicant: Samsung Electronics Co., Ltd., Suwon-si (KR)

(72) Inventors: Sungsoo Kim, Suwon-si (KR); Jaehoon Jo, Suwon-si (KR); Yongyoun Kim, Suwon-si (KR); Dongyoung Lee, Suwon-si (KR); Woomin Jang, Suwon-si (KR); Seungbum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 17/980,128

(22) Filed: Nov. 3, 2022

(65) Prior Publication Data

US 2023/0198126 A1 Jun. 22, 2023

Related U.S. Application Data

(63) Continuation of application No. PCT/KR2022/014212, filed on Sep. 23, 2022.

(30) Foreign Application Priority Data

Dec. 17, 2021 (KR) .................. 10-2021-0181503
Jan. 14, 2022 (KR) .................. 10-2022-0005883

(51) Int. Cl.
*H01Q 1/24* (2006.01)
*G01D 5/24* (2006.01)
(Continued)

(52) U.S. Cl.
CPC ............... *H01Q 1/243* (2013.01); *G01D 5/24* (2013.01); *G01L 1/142* (2013.01); *H01Q 9/0407* (2013.01)

(58) Field of Classification Search
CPC ........ H01Q 1/243; H01Q 9/0407; H01Q 5/40; H01Q 9/0414; H01Q 21/08; G01D 5/24; G01L 1/142
See application file for complete search history.

(56) References Cited

U.S. PATENT DOCUMENTS 9,257,750 B2   2/2016  Vazquez et al.
10,141,626 B2 * 11/2018  Tan ...................... H01Q 1/22
(Continued)

FOREIGN PATENT DOCUMENTS

KR   10-2019-0088213 A   7/2019
KR      10-2022353 B1    9/2019
(Continued)

OTHER PUBLICATIONS

International Search Report dated Jan. 2, 2023, issued in International Application No. PCT/KR2022/014212.

*Primary Examiner* — Seung H Lee
(74) *Attorney, Agent, or Firm* — Jefferson IP Law, LLP

(57) ABSTRACT

An electronic device is provided. The electronic device includes a housing including a first surface, a second surface opposite to the first surface, and a side surface between the first surface and the second surface, an antenna including a carrier including a first carrier surface facing the side surface, a second carrier surface opposite to the first carrier surface and a plurality of side carrier surfaces between the first carrier surface and the second carrier surface, and a patch positioned on the first carrier surface, a first capacitive sensor positioned between the first carrier surface and the side surface, and a filler positioned between the side surface and the first carrier surface.

20 Claims, 24 Drawing Sheets

(51) Int. Cl.
*G01L 1/14* (2006.01)
*H01Q 9/04* (2006.01)

(56) References Cited

U.S. PATENT DOCUMENTS

| | | |
|---|---|---|
| 11,081,808 B2 * | 8/2021 | Yun ..................... H01Q 21/065 |
| 2014/0111684 A1 | 4/2014 | Corbin et al. |
| 2020/0194879 A1 | 6/2020 | Lim et al. |
| 2020/0257385 A1 | 8/2020 | Hartmann et al. |
| 2021/0083366 A1 | 3/2021 | Moon et al. |
| 2021/0096515 A1 * | 4/2021 | Ruaro ..................... G04G 21/04 |
| 2021/0132728 A1 | 5/2021 | Hwang et al. |

FOREIGN PATENT DOCUMENTS

| | | |
|---|---|---|
| KR | 10-2119346 B1 | 6/2020 |
| KR | 10-2020-0092719 A | 8/2020 |
| KR | 10-2020-0101256 A | 8/2020 |
| KR | 10-2256657 B1 | 5/2021 |

* cited by examiner

ELECTRONIC DEVICE COMPRISING ANTENNA

CROSS-REFERENCE TO RELATED APPLICATIONS

This application is a continuation application, claiming priority under § 365(c), of an International application No. PCT/KR2022/014212, filed on Sep. 23, 2022, which is based on and claims the benefit of a Korean patent application number 10-2021-0181503, filed on Dec. 17, 2021, in the Korean Intellectual Property Office, and of a Korean patent application number 10-2022-0005883, filed on Jan. 14, 2022, in the Korean Intellectual Property Office, the disclosure of each of which is incorporated by reference herein in its entirety.

BACKGROUND

1. Field

The disclosure relates to an electronic device including an antenna.

2. Description of Related Art

A technology for arranging a plurality of components in an electronic device based on space efficiency is being developed. For example, to secure the performance of an antenna module, it may be considered to arrange the antenna module in an area different from an area where an input module is disposed in the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface, a second surface opposite to the first surface, and a side surface between the first surface and the second surface, an antenna including a carrier including a first carrier surface facing the side surface, a second carrier surface opposite to the first carrier surface and a plurality of side carrier surfaces between the first carrier surface and the second carrier surface, and a patch positioned on the first carrier surface, a first capacitive sensor positioned between the first carrier surface and the side surface, and a filler positioned between the side surface and the first carrier surface.

In accordance with another aspect of the disclosure, an electronic device is provided. The electronic device includes a housing including a first surface, a second surface opposite to the first surface, and a side surface between the first surface and the second surface, an antenna including a carrier including a first carrier surface facing the side surface and a second carrier surface opposite to the first carrier surface, a first patch embedded between the first carrier surface and the second carrier surface in the carrier and configured to operate in a first frequency band, and a second patch embedded between the first patch and the first carrier surface in the carrier and configured to operate in a second frequency band different from the first frequency band, and a filler positioned between the side surface and the first carrier surface.

In accordance with another aspect of the disclosure, an electronic device is provided. The electronic device includes a housing including a first surface, a second surface opposite to the first surface, and a side surface between the first surface and the second surface, an antenna including a carrier including a first carrier surface facing the side surface and a second carrier surface opposite to the first carrier surface, and a patch embedded between the first carrier surface and the second carrier surface in the carrier, a capacitive sensor embedded between the patch and the first carrier surface in the carrier, and a filler positioned between the side surface and the first carrier surface.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
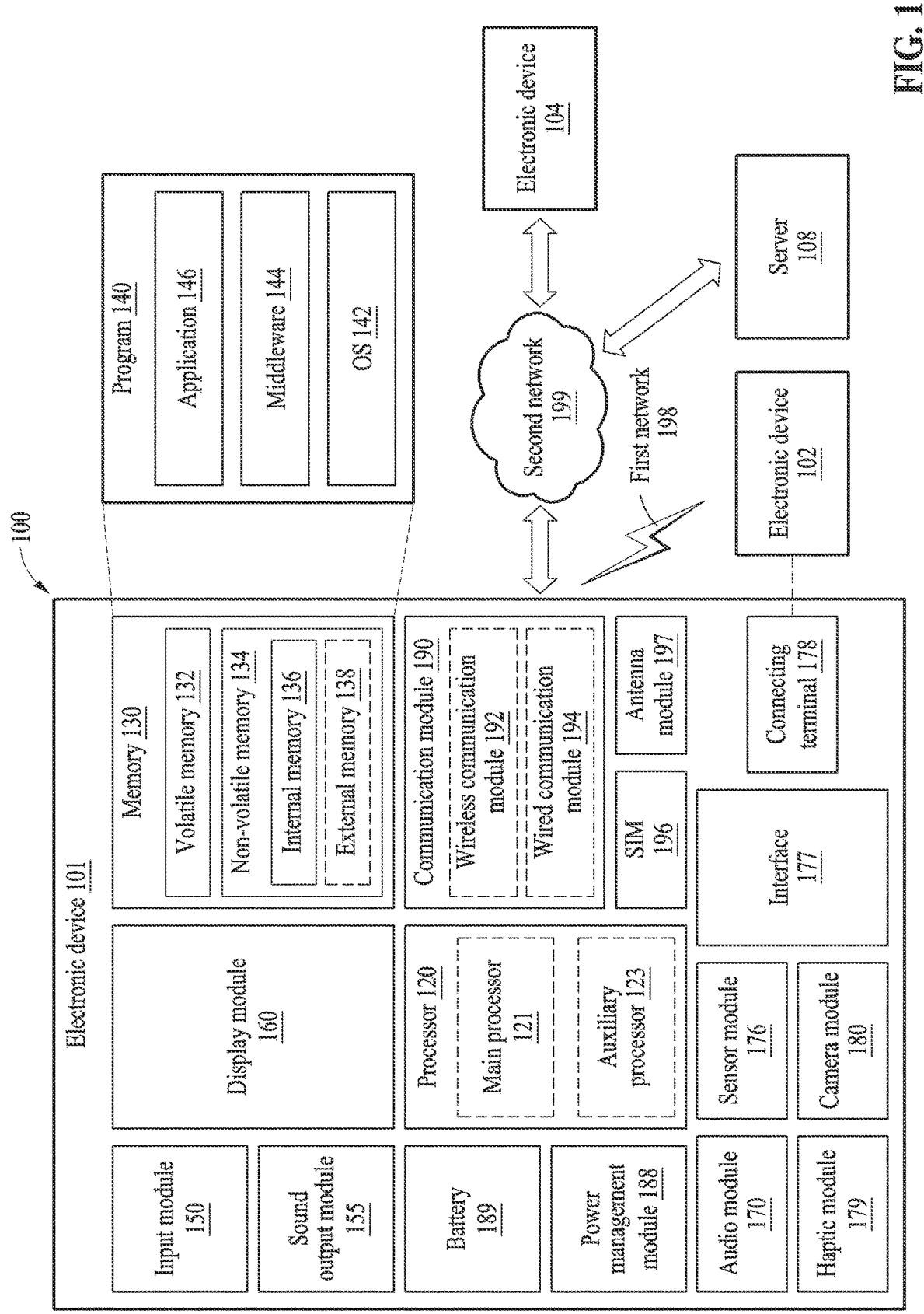
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that an embodiment of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2A:
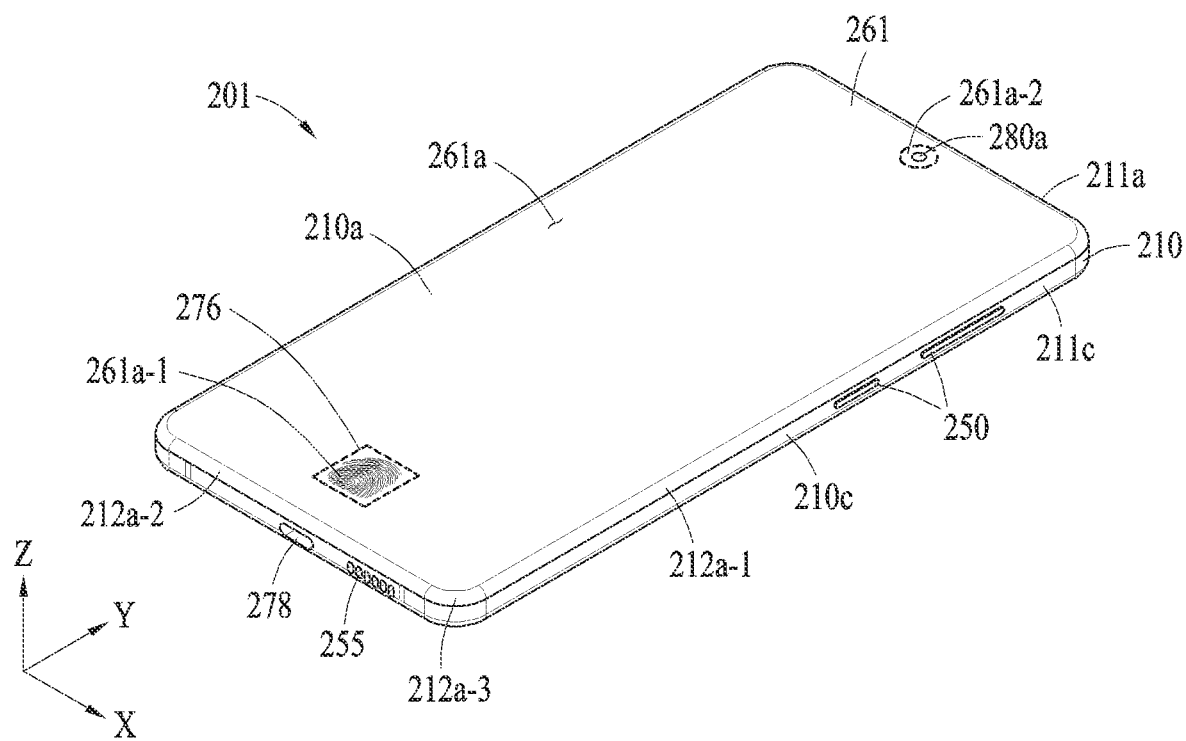
FIG. 2A is a perspective view of an electronic device viewed in one direction according to an embodiment of the disclosure.
Figure 2B:
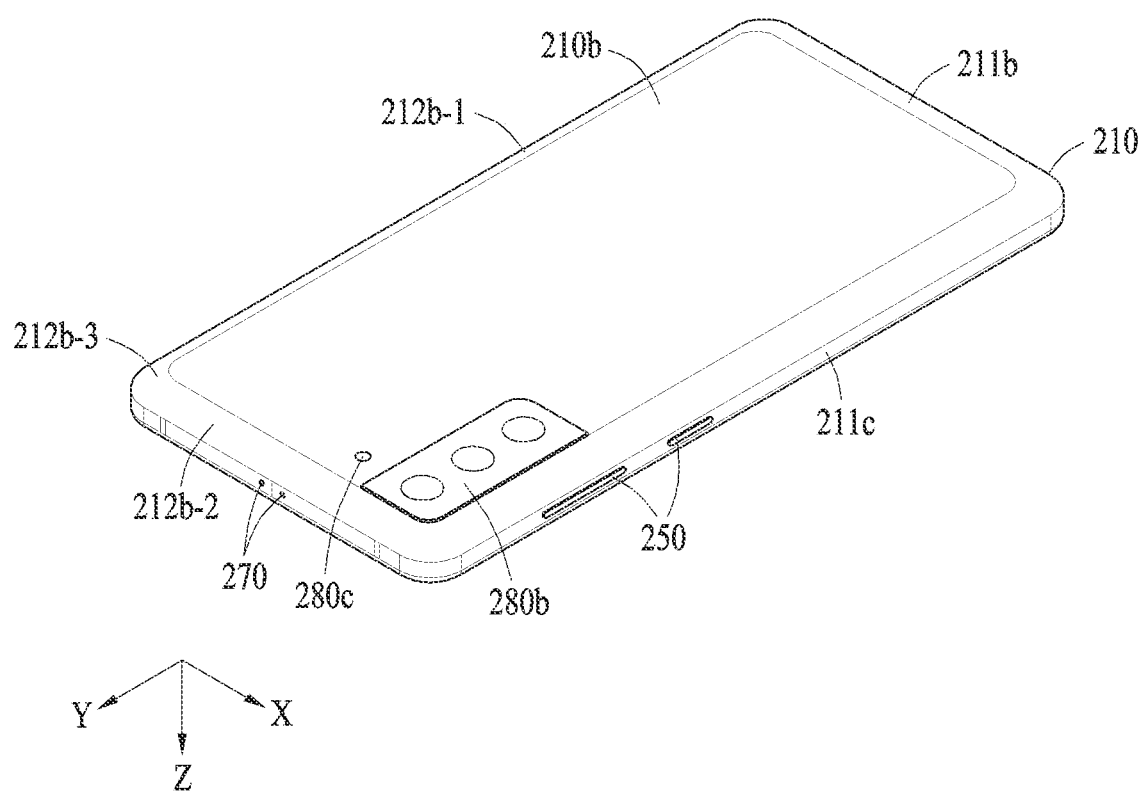
FIG. 2B is a perspective view of an electronic device viewed in another direction according to an embodiment of the disclosure.
Figure 2C:
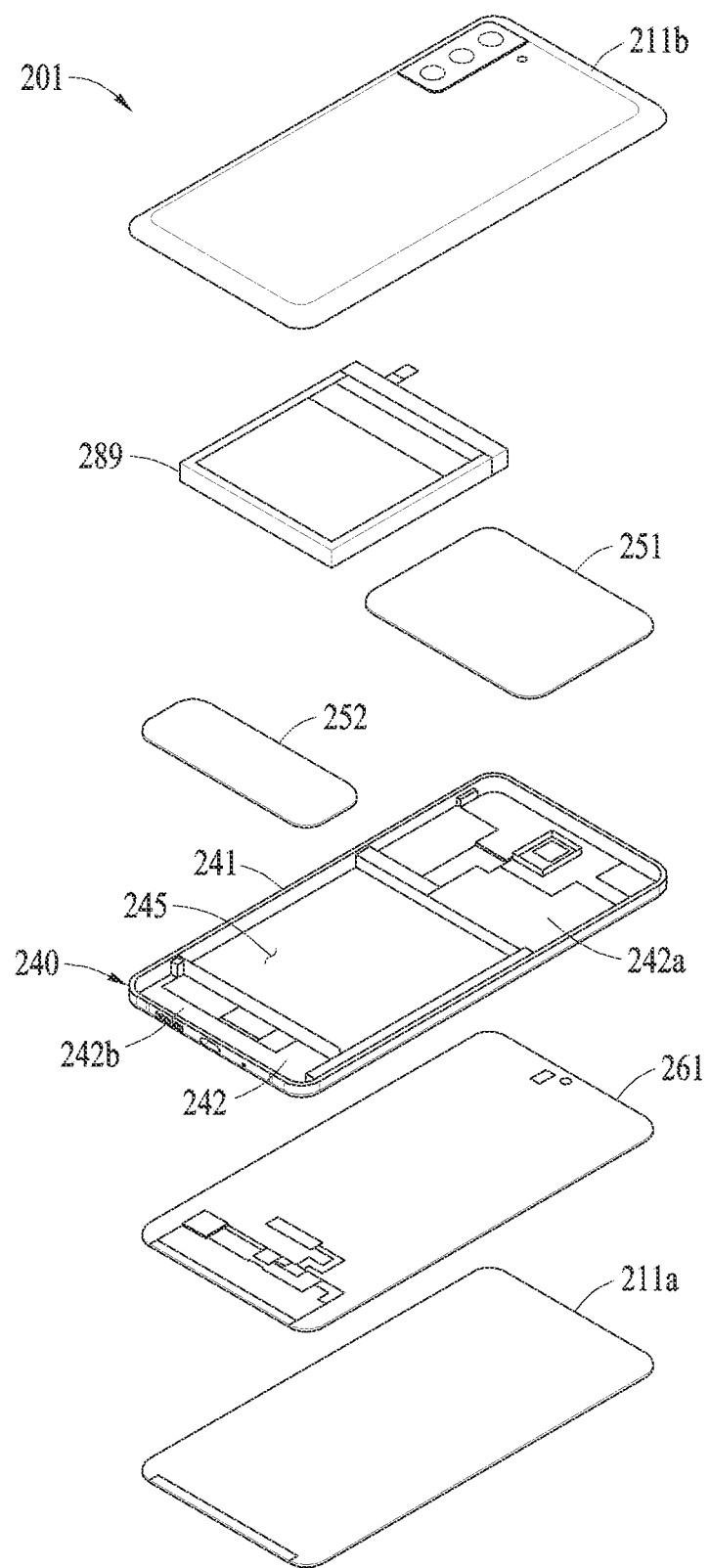
FIG. 2C is an exploded perspective view of an electronic device according to an embodiment of the disclosure.

FIG. 2A is a perspective view of an electronic device viewed in one direction according to an embodiment of the disclosure. FIG. 2B is a perspective view of an electronic device viewed in another direction according to an embodiment of the disclosure. FIG. 2C is an exploded perspective view of an electronic device according to an embodiment of the disclosure.

Referring to FIGS. 2A to 2C, an electronic device 201 (e.g., the electronic device 101 of FIG. 1) may include a housing 210 including a first surface 210a (e.g., a front surface), a second surface 210b (e.g., a rear surface), and a third surface 210c (e.g., a side surface) enclosing a space between the first surface 210a and the second surface 210b.

The first surface 210a may be formed by a first plate 211a of which at least a portion is substantially transparent. For example, the first plate 211a may include a polymer plate or a glass plate including at least one coating layer. The second surface 210b may be formed by a second plate 211b that is substantially opaque. For example, the second plate 211b may be formed of coated or tinted glass, ceramic, polymer, metal (e.g., aluminum, stainless steel (STS), or magnesium), or a combination thereof. The third surface 210c may be formed by a frame 211c that is coupled to the first plate 211a and the second plate 211b and that includes a metal and/or a polymer. The second plate 211b and the frame 211c may be integrated and seamlessly formed. According to an embodiment of the disclosure, the second plate 211b and the frame 211c may be formed of substantially the same material (e.g., aluminum).

The first plate 211a may include a plurality of first periphery areas 212a-1 that are rounded in a direction from at least one area of the first surface 210a toward the second plate 211b and extend in one direction (e.g., a +/−Y direction), a plurality of second periphery areas 212a-2 that are rounded in the direction from at least one area of the first surface 210a toward the second plate 211b and extend in another direction (e.g., a +/−X direction), and a plurality of third periphery areas 212a-3 that are rounded in the direction from at least one area of the first surface 210a toward the second plate 211b and positioned between the plurality of first periphery areas 212a-1 and the plurality of second periphery areas 212a-2. The second plate 211b may include a plurality of fourth periphery areas 212b-1 that are rounded in a direction from at least one area of the second surface 210b toward the first plate 211a and extend in one direction (e.g., the +/−Y direction), a plurality of fifth periphery areas 212b-2 that are rounded in the direction from at least one area of the second surface 210b toward the first plate 211a and extend in the other direction (e.g., the +/−X direction), and a plurality of sixth periphery areas 212b-3 that are rounded in the direction from at least one area of the second surface 210b toward the first plate 211a and positioned between the plurality of fourth periphery areas 212b-1 and the plurality of fifth periphery areas 212b-2.

The electronic device 201 may include a display 261 (e.g., the display module 160). The display 261 may be positioned on the first surface 210a. The display 261 may be exposed through at least a portion (e.g., the plurality of first periphery areas 212a-1, the plurality of second periphery areas 212a-2, and the plurality of third periphery areas 212a-3) of the first plate 211a. The display 261 may have a shape that is substantially the same as the shape of an outer edge of the first plate 211a. The periphery of the display 261 may substantially coincide with the outer edge of the first plate 211a. The display 261 may include a touch sensing circuit, a pressure sensor for measuring an intensity (pressure) of a touch, and/or a digitizer for detecting a magnetic-type stylus pen. The display 261 may include a screen display area 261a that is visually exposed to display content using pixels. The screen display area 261a may include a sensing area 261a-1 and/or a camera area 261a-2. The sensing area 261a-1 may overlap at least one area of the screen display area 261a. The sensing area 261a-1 may allow transmission of an input signal related to a sensor module 276 (e.g., the sensor module 176). The sensing area 261a-1 may display content, similarly to the screen display area 261a that does not overlap the sensing area 261a-1. For example, the sensing area 261a-1 may display the content while the sensor module 276 is not operating. The camera area 261a-2 may overlap at least one area of the screen display area 261a. The camera area 261a-2 may allow transmission of an optical signal related to a first camera module 280a (e.g., the camera module 180). The camera area 261a-2 may display content, similarly to the screen display area 261a that does not overlap the camera area 261a-2. For example, the camera area 261a-2 may display the content while the first camera module 280a is not operating.

The electronic device 201 may include an audio module 270 (e.g., the audio module 170). The audio module 270 may be positioned on the third surface 210c. The audio module 270 may obtain sound through at least one hole.

The electronic device 201 may include the sensor module 276. The sensor module 276 may be positioned on the first surface 210a. The sensor module 276 may form the sensing area 261a-1 in at least a portion of the screen display area 261a. The sensor module 276 may receive an input signal transmitted through the sensing area 261a-1 and generate an electrical signal based on the received input signal. For example, the input signal may have a designated physical quantity (e.g., heat, light, temperature, sound, pressure, or ultrasound). In an example, the input signal may include a signal related to biometric information (e.g., a fingerprint) of a user.

The electronic device 201 may include the first camera module 280a, a second camera module 280b (e.g., the camera module 180), and a flash 280c. The first camera module 280a may be positioned on the first surface 210a, and the second camera module 280b and the flash 280c may be positioned on the second surface 210b. At least a portion of the first camera module 280a may be positioned under the display 261. The first camera module 280a may receive an optical signal transmitted through the camera area 261a-2. The second camera module 280b may include a plurality of camera modules (e.g., a dual camera, a triple camera, or a quad camera). In an embodiment, the flash 280c may include a light-emitting diode or a xenon lamp.

The electronic device 201 may include a sound output module 255 (e.g., the sound output module 155). In an embodiment, the sound output module 255 may be positioned on the third surface 210c. In an embodiment, the sound output module 255 may include one or more holes.

The electronic device 201 may include an input module 250 (e.g., the input module 150). The input module 250 may be positioned on the third surface 210c. The input module 250 may include at least one key input device.

The electronic device 201 may include a connecting terminal 278 (e.g., the connecting terminal 178). The connecting terminal 278 may be positioned on the third surface 210c. For example, when the electronic device 201 is viewed in one direction (e.g., the +Y direction), the connecting terminal 278 may be positioned in a central portion of the third surface 210c, and the sound output module 255 may be positioned on one side (e.g., a right side) with respect to the connecting terminal 278.

The electronic device 201 may include a support body 240, a first circuit board 251, a second circuit board 252, and a battery 289 (e.g., the battery 189). At least a portion of the support body 240 may form the housing 210 together with the first plate 211a and the second plate 211b. In an embodiment, the support body 240 may include a frame structure 241 (e.g., the frame 211c) and a plate structure 242. The frame structure 241 may be formed to surround the periphery of the plate structure 242. The frame structure 241 may connect the periphery of the first plate 211a and the periphery of the second plate 211b, surround the space between the first plate 211a and the second plate 211b, and form the third surface 210c of the electronic device 201. The plate structure 242 may include a first portion 242a for accommodating the first circuit board 251, and a second portion 242b for accommodating the second circuit board 252. The display 261 may be positioned on one surface (e.g., a bottom surface as shown in FIG. 2C) of the plate structure 242, and the first circuit board 251 and the second circuit board 252 may be positioned on the other surface (e.g., a top surface as shown in FIG. 2C) of the plate structure 242. The plate structure 242 may include an opening 245 positioned between the first portion 242a and the second portion 242b and passing through both surfaces of the plate structure 242. The opening 245 may accommodate the battery 289.

The disclosure may also be applicable to electronic devices of various shapes/forms (e.g., foldable and/or slidable electronic devices) in addition to the electronic device 201 illustrated in FIGS. 2A to 2C.

Figure 3A:
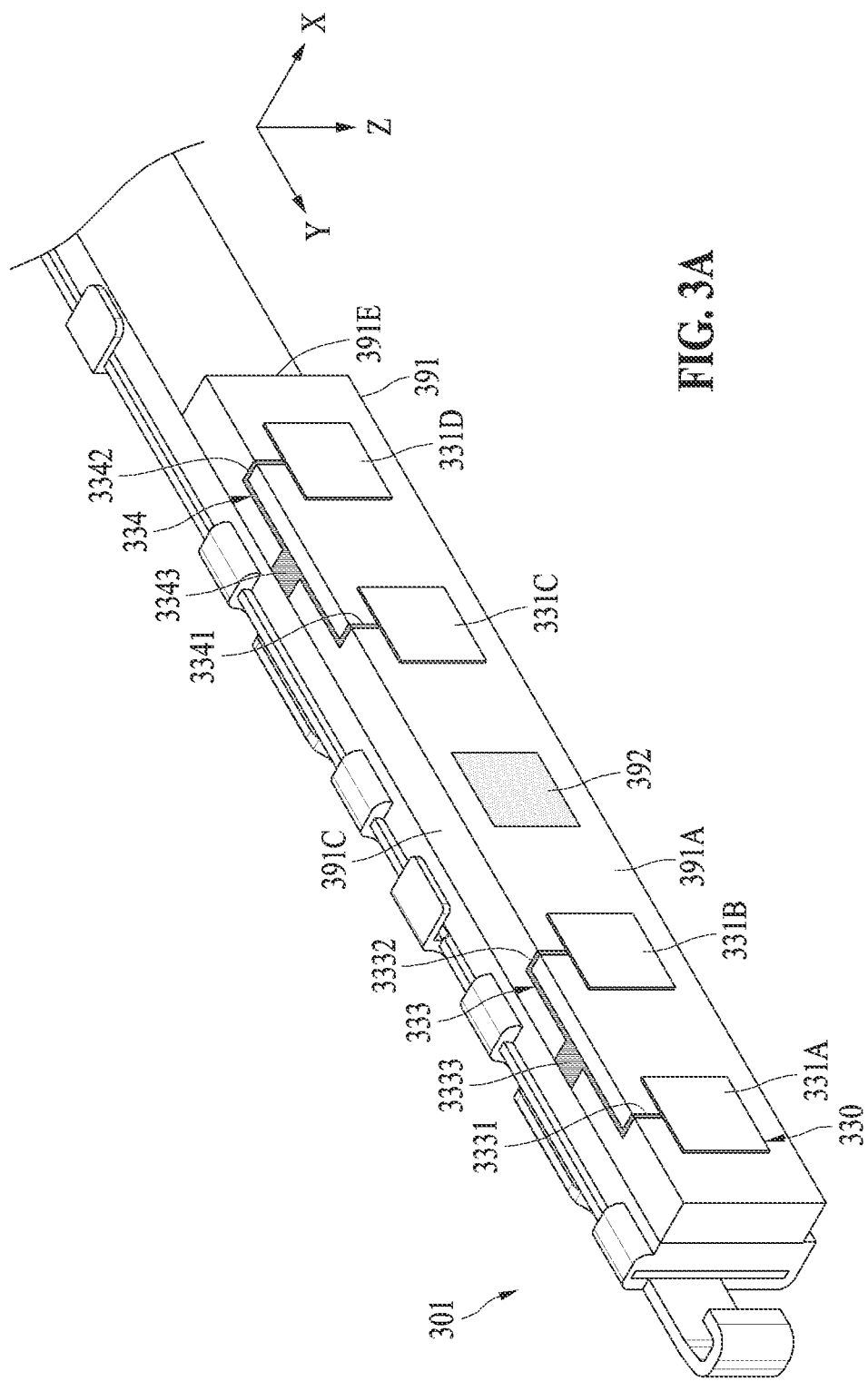
FIG. 3A is a perspective view of an antenna and a sensor arranged in an electronic device viewed in one direction according to an embodiment of the disclosure.
Figure 3B:
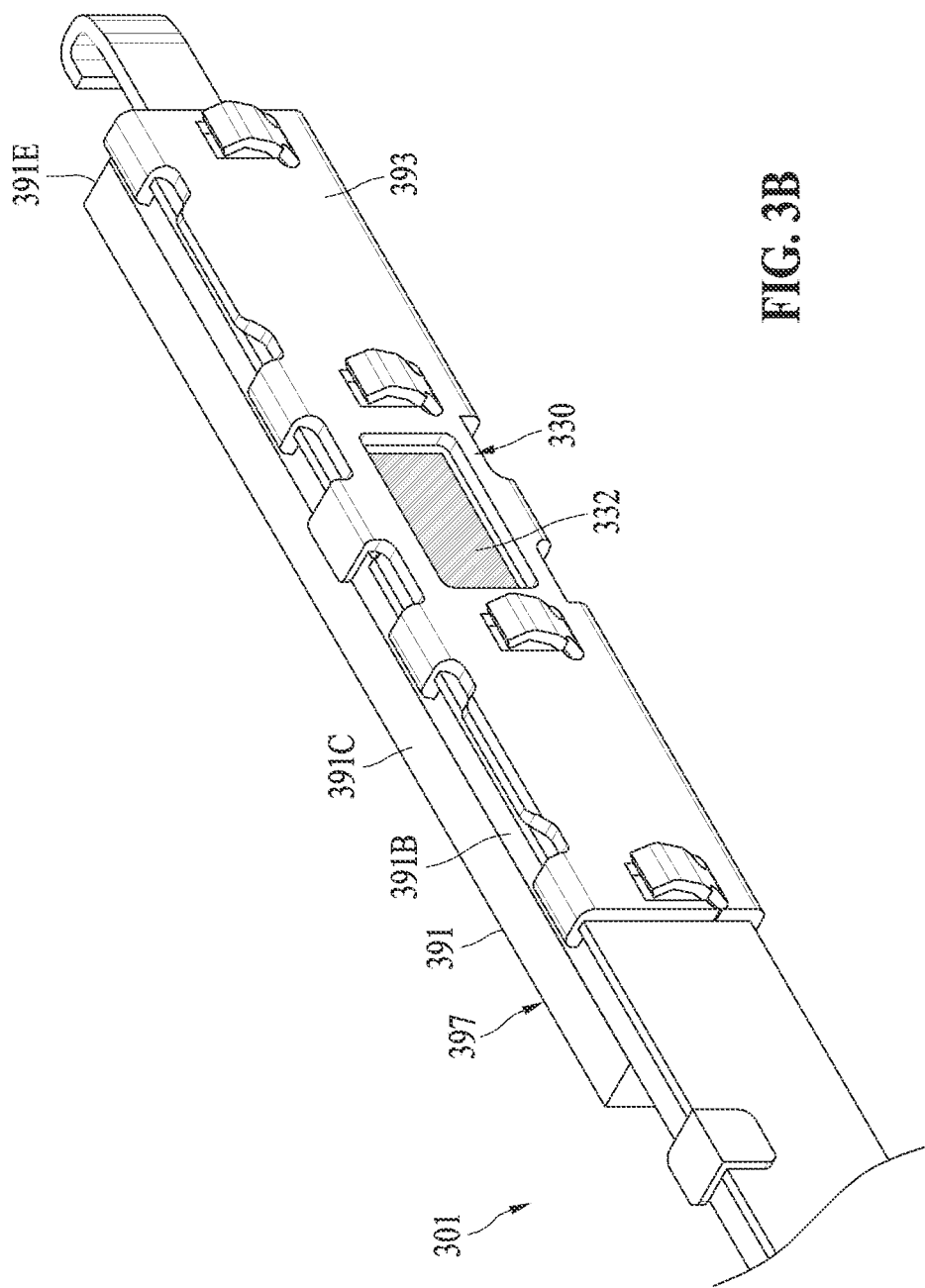
FIG. 3B is a perspective view of an antenna and a sensor arranged in an electronic device viewed in another direction according to an embodiment of the disclosure.
Figure 3C:
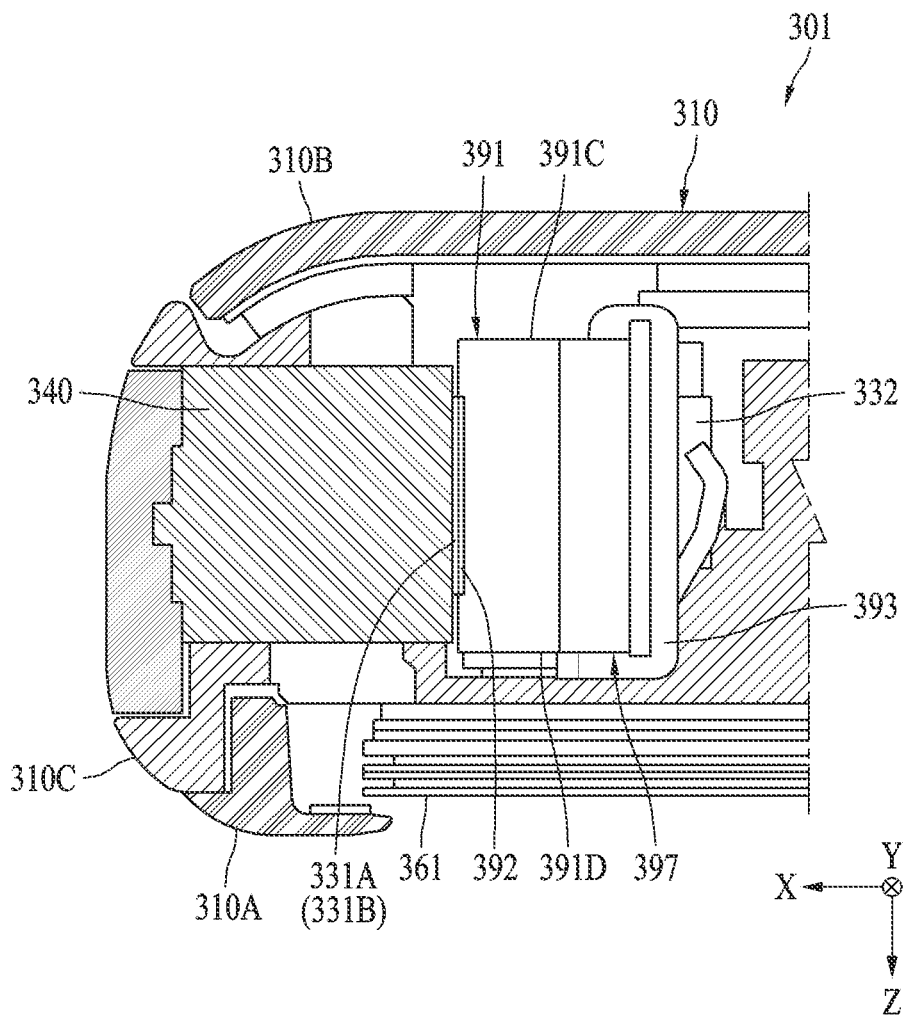
FIG. 3C is a cross-sectional view of an antenna and a sensor arranged in an electronic device according to an embodiment of the disclosure.
Figure 3D:
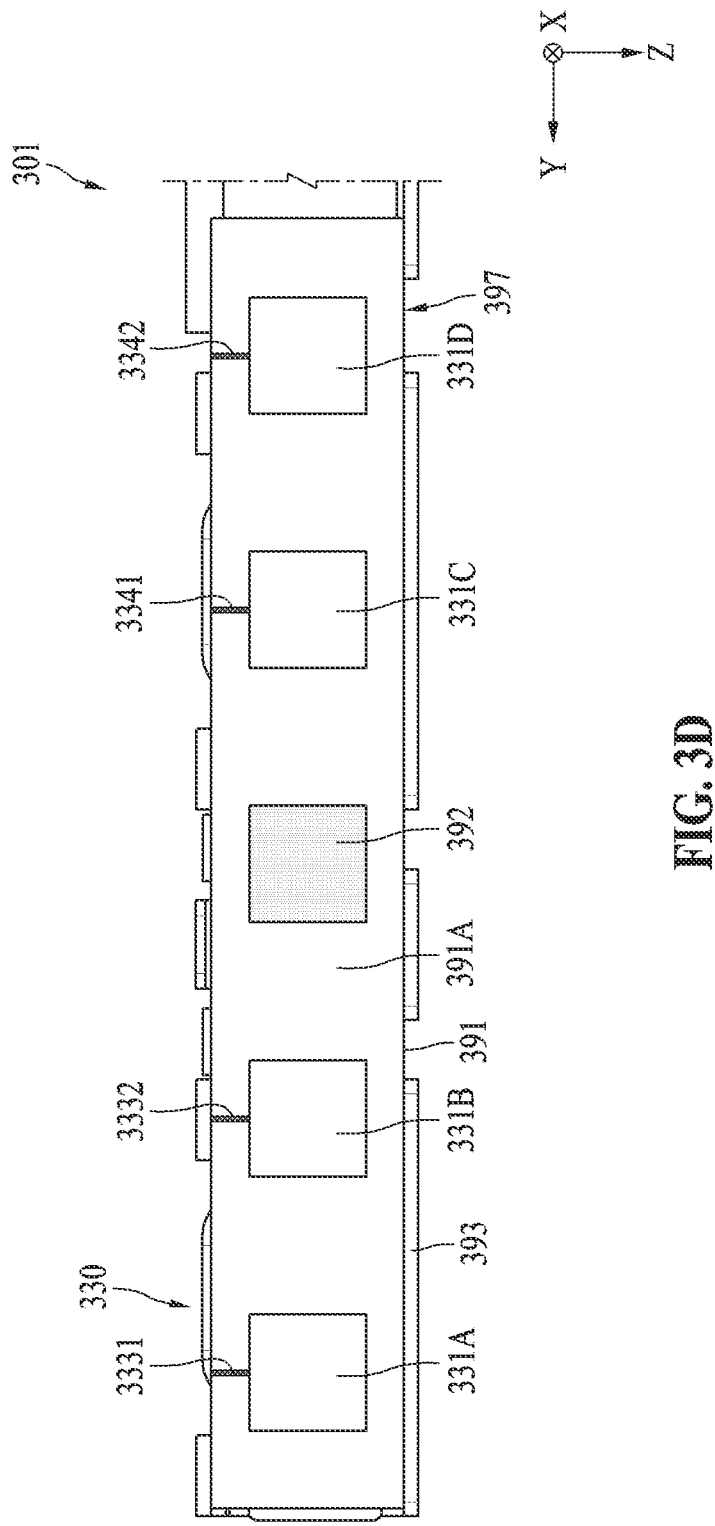
FIG. 3D is a view of one side of an antenna and a sensor according to an embodiment of the disclosure.

FIG. 3A is a perspective view of an antenna and a sensor arranged in an electronic device viewed in one direction according to an embodiment of the disclosure. FIG. 3B is a perspective view of an antenna and a sensor arranged in an electronic device viewed in another direction according to an embodiment of the disclosure. FIG. 3C is a cross-sectional view of an antenna and a sensor arranged in an electronic device according to an embodiment of the disclosure. FIG. 3D is a view of one side of an antenna and a sensor according to an embodiment of the disclosure.

Referring to FIGS. 3A to 3D, an electronic device 301 may include a housing 310 (e.g., the housing 210 of FIGS. 2A to 2C). The housing 310 may include a first surface 310A (e.g., the first surface 210a), a second surface 310B (e.g., the second surface 210b) opposite to the first surface 310A, and a side surface 310C (e.g., the third surface 210c) between the first surface 310A and the second surface 310B. The electronic device 301 may include a display 361 (e.g., the display 261) positioned on the first surface 310A.

The electronic device 301 may include an antenna 397 (e.g., the antenna module 197 of FIG. 1) positioned between the first surface 310A and the second surface 310B. The antenna 397 may include a carrier 391, a plurality (e.g., five) of patches 392, and a support body 393.

The carrier 391 may include a first carrier surface 391A (e.g., a front surface) facing the side surface 310C, a second carrier surface 391B (e.g., a rear surface) opposite to the first carrier surface 391A, a first side surface 391C (e.g., an upper surface) between the first carrier surface 391A and the second carrier surface 391B, a second side surface 391D (e.g., a lower surface) opposite to the first side surface 391C, and a plurality of (e.g., two) third side surfaces 391E positioned between the first carrier surface 391A and the second carrier surface 391B and between the first side surface 391C and the second side surface 391D.

The plurality of patches 392 may be configured to radiate signals of a predetermined frequency band. For example, the frequency band may include a mmWave band. The plurality of patches 392 may be arranged in one direction (e.g., the +/−Y direction) on the first carrier surface 391A. For example, the plurality of patches 392 may be positioned on substantially the same line.

According to an embodiment of the disclosure, the plurality of patches 392 may have any minimum size suitable to form multi-resonance. For example, the plurality of patches 392 may have a size of at least about 1.8 millimeters (mm) × about 1.8 mm.

The support body 393 may be configured to support the carrier 391. The support body 393 may at least partially enclose the carrier 391. For example, the support body 393 may at least partially enclose the second carrier surface 391B, the first side surface 391C, and the second side surface 391D. The support body 393 may be formed of, for example, stainless steel.

The electronic device 301 may include a sensor module 330 (e.g., the sensor module 176 of FIG. 1) configured to sense a user input. The sensor module 330 may sense a volume, a fingerprint, and other user inputs or sensory inputs. The sensor module 330 may include a circuit board, a plurality of capacitive sensors 331A, 331B, 331C, and 331D, an inductive sensor 332, and a reference sensor.

The plurality of capacitive sensors 331A, 331B, 331C, and 331D may be configured to sense a user's touches and/or positioning.

The plurality of capacitive sensors 331A, 331B, 331C, and 331D may have a shape sufficient to sense a user's touch and/or positioning. The plurality of capacitive sensors 331A, 331B, 331C, and 331D may be set to have an arbitrary shape suitable to ensure radiation performance of the plurality of patches 392. For example, shapes of the plurality of capacitive sensors 331A, 331B, 331C, and 331D may include a conductive patch with a substantially rectangular shape.

The plurality of capacitive sensors 331A, 331B, 331C, and 331D may be positioned between the first carrier surface 391A and the side surface 310C. The plurality of capacitive sensors 331A, 331B, 331C, and 331D may be positioned on some patches 392 among the plurality of patches 392. The plurality of capacitive sensors 331A, 331B, 331C, and 331D may be positioned to at least partially overlap one or more of the patches 392.

The plurality of capacitive sensors 331A, 331B, 331C, and 331D may include a first capacitive sensor 331A, a second capacitive sensor 331B, a third capacitive sensor 331C, and a fourth capacitive sensor 331D. The first capacitive sensor 331A and the second capacitive sensor 331B may form a first set, and the third capacitive sensor 331C and the fourth capacitive sensor 331D may form a second set. The first set of the capacitive sensors 331A and 331B, and the second set of the capacitive sensors 331C and 331D may be spaced apart from each other with at least one patch 392 interposed therebetween. The first set of the capacitive sensors 331A and 331B may be configured to generate a first recognition signal (e.g., a volume increase signal), and the second set of the capacitive sensors 331C and 331D may be configured to generate a second recognition signal (e.g., a volume reduction signal) different from the first recognition signal.

The plurality of capacitive sensors 331A, 331B, 331C, and 331D may have a size sufficient to sense a user's touch and/or positioning. The plurality of capacitive sensors 331A, 331B, 331C, and 331D may be set to have an arbitrary size suitable to ensure the radiation performance of the plurality of patches 392. For example, the size of the plurality of capacitive sensors 331A, 331B, 331C, and 331D may be substantially equal to or less than the size of the plurality of patches 392.

The inductive sensor 332 may be configured to sense a force. The inductive sensor 332 may be positioned on the second carrier surface 391B and/or on the support body 393. The inductive sensor 332 may be positioned on a carrier surface other than the second carrier surface 391B. The inductive sensor 332 may be positioned on components other than the carrier 391 and the support body 393 within the housing 310.

The reference sensor may be configured to generate a reference signal that is used as a criterion for signals generated by the plurality of capacitive sensors 331A, 331B, 331C, and 331D and/or a signal generated by the inductive sensor 332. For example, a processor (e.g., the processor 120 of FIG. 1) may be configured to calculate a force, based on a signal generated by the inductive sensor 332 and a signal generated by the reference sensor, for example, based on a difference between the above two signals. Although not shown in FIGS. 3A to 3D, the reference sensor may be disposed in an arbitrary position that does not reduce performance of the antenna 397 and/or the sensor module 330.

The circuit board may be electrically connected to the plurality of capacitive sensors 331A, 331B, 331C, and 331D, the inductive sensor 332, and the reference sensor. The plurality of capacitive sensors 331A, 331B, 331C, and 331D may be calibrated on the circuit board to adjust a positioning sensing distance and/or sensitivity. Although not shown in FIGS. 3A to 3D, the circuit board may be disposed in an arbitrary position that does not reduce the performance of the antenna 397 and/or the sensor module 330.

The sensor module 330 may include a plurality of (e.g., two) transmission lines 333 and 334 that connect the plurality of capacitive sensors 331A, 331B, 331C, and 331D. For example, the sensor module 330 may include a pair of transmission lines 333 and 334. One transmission line 333 may electrically connect the first capacitive sensor 331A and the second capacitive sensor 331B, and the other transmission line 334 may electrically connect the third capacitive sensor 331C and the fourth capacitive sensor 331D.

The one transmission line 333 of the pair of transmission lines 333 and 334 may include a first line 3331 that is connected to the first capacitive sensor 331A and that is positioned on the first carrier surface 391A and the first side surface 391C, a second line 3332 that is connected to the second capacitive sensor 331B and that is positioned on the first carrier surface 391A and the first side surface 391C, and a third line 3333 that is positioned on the first carrier surface 391A and that electrically connects the first line 3331 and the second line 3332 to the circuit board.

The first line 3331 may be connected to a central portion of one of edges of the first capacitive sensor 331A. The first line 3331 may extend from one edge of the first capacitive sensor 331A in a first direction (e.g., the −Z direction) on the first carrier surface 391A, may extend in a second direction (e.g., the −X direction) crossing the first direction on the first side surface 391C, and may extend in a third direction (e.g., the −Y direction) crossing each of the first direction and the second direction on the first side surface 391C.

The second line 3332 may be connected to a central portion of one of edges of the second capacitive sensor 331B. In an embodiment, the second line 3332 may extend from one edge of the second capacitive sensor 331B in the first direction (e.g., the −Z direction) on the first carrier surface 391A, may extend in the second direction (e.g., the −X direction) crossing the first direction on the first side surface 391C, and may extend in a fourth direction (e.g., the +Y direction) that is opposite to the third direction and that crosses each of the first direction and the second direction on the first side surface 391C.

The one transmission line 333 of the pair of transmission lines 333 and 334 may be integrally and seamlessly connected to the first capacitive sensor 331A and/or the second capacitive sensor 331B. The first transmission line 333 may be separably connected to the first capacitive sensor 331A and/or the second capacitive sensor 331B.

The other transmission line 334 of the pair of transmission lines 333 and 334 may include a fourth line 3341 that is connected to the third capacitive sensor 331C and that is positioned on the first carrier surface 391A and the first side surface 391C, a fifth line 3342 that is connected to the fourth capacitive sensor 331D and that is positioned on the first carrier surface 391A and the first side surface 391C, and a sixth line 3343 that is positioned on the first carrier surface 391A and that electrically connects the fourth line 3341 and the fifth line 3342 to the circuit board.

The fourth line 3341 may be connected to a central portion of one of edges of the third capacitive sensor 331C. The fourth line 3341 may extend from one edge of the third capacitive sensor 331C in the first direction (e.g., the −Z direction) on the first carrier surface 391A, may extend in the second direction (e.g., the −X direction) crossing the first direction on the first side surface 391C, and may extend in the third direction (e.g., the −Y direction) crossing each of the first direction and the second direction on the first side surface 391C.

The fifth line 3342 may be connected to a central portion of one of edges of the fourth capacitive sensor 331D. The fifth line 3342 may extend from one edge of the fourth capacitive sensor 331D in the first direction (e.g., the −Z direction) on the first carrier surface 391A, may extend in the second direction (e.g., the −X direction) crossing the first direction on the first side surface 391C, and may extend in the fourth direction (e.g., the +Y direction) that is opposite to the third direction and that crosses each of the first direction and the second direction on the first side surface 391C.

The other transmission line 334 of the pair of transmission lines 333 and 334 may be integrally and seamlessly connected to the third capacitive sensor 331C and/or the fourth capacitive sensor 331D. In an embodiment, the transmission line 334 may also be separably connected to the third capacitive sensor 331C and/or the fourth capacitive sensor 331D.

At least one of the pair of transmission lines 333 and 334 may include a device having an inductance of a predetermined value. At least one of the pair of transmission lines 333 and 334 may include a meandering pattern. The pair of transmission lines 333 and 334 is not limited to the above embodiments, and may have various types of components and/or structures that may compensate for a reduction in pole performance in all directions.

The electronic device 301 may include a filler 340 disposed between the side surface 310C and a plurality of capacitive sensors 331A, 331B, 331C, and 331D. For example, a key input device (e.g., the input module 250 of FIGS. 2A to 2C) may be positioned on the side surface 310C. If a user presses the key input device, a pressure may be transmitted to the plurality of capacitive sensors 331A, 331B, 331C, and 331D through the filler 340, and an input of the user may be recognized by the plurality of capacitive sensors 331A, 331B, 331C, and 331D. The pressure may be transmitted to the inductive sensor 332 through the filler 340, and a force may be measured by the inductive sensor 332.

The filler 340 may have an arbitrary size suitable for a passing of fields radiated by the plurality of patches 392. The size of the filler 340 may be determined based on the illustrated structure of the electronic device 301 and/or component(s) in the electronic device 301.

At least a portion of the filler 340 may be formed of an arbitrary material suitable for a passing of the fields radiated by the plurality of patches 392. The filler 340 may be formed of, for example, a plastic material.

Figure 4:
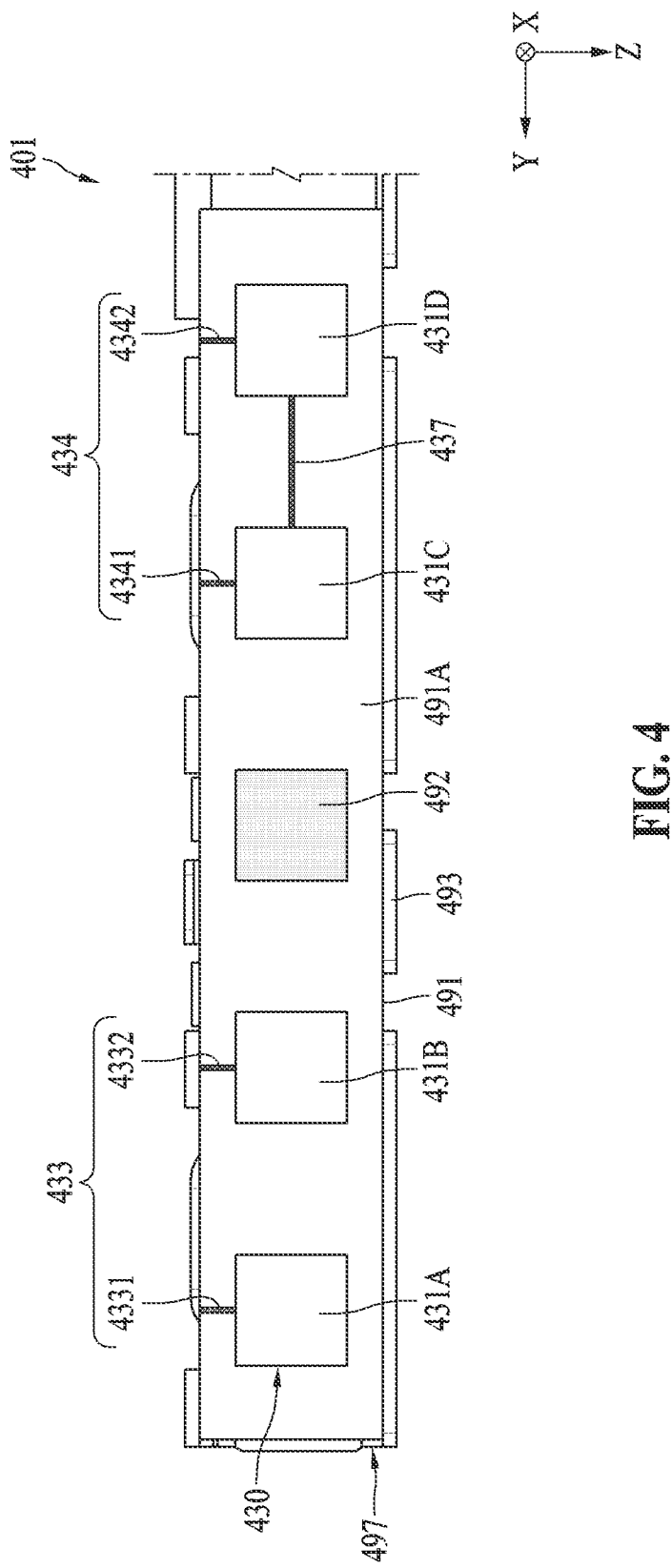
FIG. 4 is a view illustrating an antenna and a sensor according to an embodiment of the disclosure.

FIG. 4 is a view illustrating an antenna and a sensor according to an embodiment of the disclosure.

Referring to FIG. 4, an electronic device 401 (e.g., the electronic device 301 of FIGS. 3A to 3D) may include an antenna 497 (e.g., the antenna 397), and a sensor module 430 (e.g., the sensor module 330).

The antenna 497 may include a carrier 491 (e.g., the carrier 391), a plurality of patches 492 (e.g., the patches 392), and a support body 493 (e.g., the support body 393).

The sensor module 430 may include a plurality of capacitive sensors 431A, 431B, 431C, and 431D (e.g., the capacitive sensors 331A, 331B, 331C, and 331D), a pair of first transmission lines 433 and 434 (e.g., the transmission lines 333 and 334), and at least one second transmission line 437.

One first transmission line 433 of the pair of first transmission lines 433 and 434 may include a first line 4331 (e.g., the first line 3331) and a second line 4332 (e.g., the second line 3332), and the other first transmission line 434 may include a fourth line 4341 (e.g., the fourth line 3341) and a fifth line 4342 (e.g., the fifth line 3342).

The at least one second transmission line 437 may connect a pair of neighboring capacitive sensors among the plurality of capacitive sensors 431A, 431B, 431C, and 431D. For example, the second transmission line 437 may connect a third capacitive sensor 431C and a fourth capacitive sensor 431D. In an example, the second transmission line 437 may connect a first capacitive sensor 431A and a second capacitive sensor 431B.

The second transmission line 437 may be positioned on a first carrier surface 491A (e.g., the first carrier surface 391A). The second transmission line 437 may extend in a direction (e.g., the +/−Y direction or the horizontal direction) crossing a direction (e.g., the −Z direction or the vertical direction) in which the first line 4331, the second line 4332, the fourth line 4341, and the fifth line 4342 extend. The second transmission line 437 may maintain and/or reduce a size of an area of each of the third capacitive sensor 431C and the fourth capacitive sensor 431D positioned on the patches 492 while increasing a total sensing area of the third capacitive sensor 431C and the fourth capacitive sensor 431D.

Figure 5:
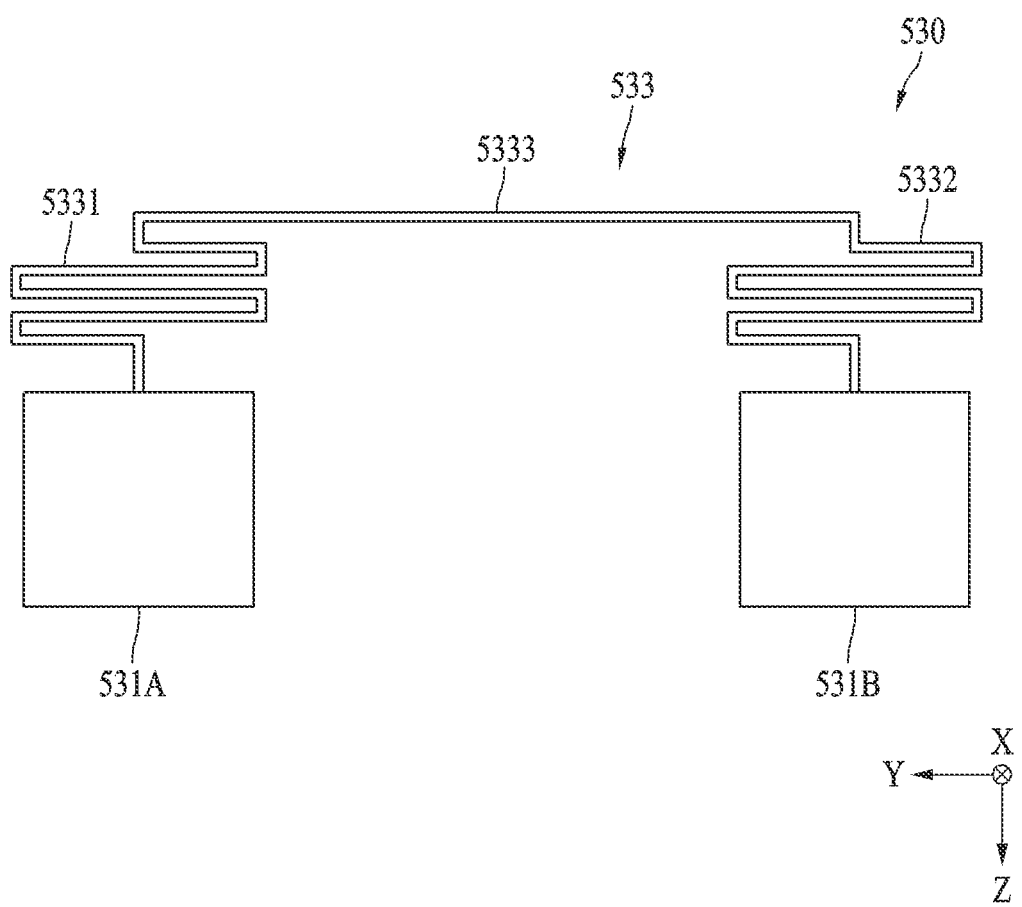
FIG. 5 is a view illustrating a sensor according to an embodiment of the disclosure.

FIG. 5 is a view illustrating a sensor according to an embodiment of the disclosure.

Referring to FIG. 5, a sensor module 530 (e.g., the sensor module 330 of FIGS. 3A to 3D) may include a first capacitive sensor 531A (e.g., the first capacitive sensor 331A and/or the third capacitive sensor 331C), a second capacitive sensor 531B (e.g., the second capacitive sensor 331B and/or the fourth capacitive sensor 331D), and a transmission line 533 (e.g., the transmission lines 333 and 334) that connects the first capacitive sensor 531A and the second capacitive sensor 531B.

The transmission line 533 may include a first line 5331 (e.g., the first line 3331), a second line 5332 (e.g., the second line 3332), and a third line 5333 (e.g., the third line 3333). For convenience of description, the first line 5331, the second line 5332, and the third line 5333 are on one plane (e.g., a YZ plane) as illustrated in FIG. 5, however, this is merely an example. For example, the first line 5331, the second line 5332, and the third line 5333 may form a three-dimensional (3D) connection structure, as shown in FIGS. 3A to 3D.

The first line 5331 and/or the second line 5332 may at least partially include a meandering pattern. One end portion of a meandering pattern in the first line 5331 and one end portion of a meandering pattern in the second line 5332 may be connected to a central portion of one edge of the first capacitive sensor 531A and a central portion of one end of the second capacitive sensor 531B, respectively. By forming at least a portion of the first line 5331 and/or at least a portion of the second line 5332 in a meandering pattern, performance of a pole (e.g., a vertical component pole) by a portion of the first line 5331 and/or a portion of the second line 5332 may be enhanced.

Figure 6:
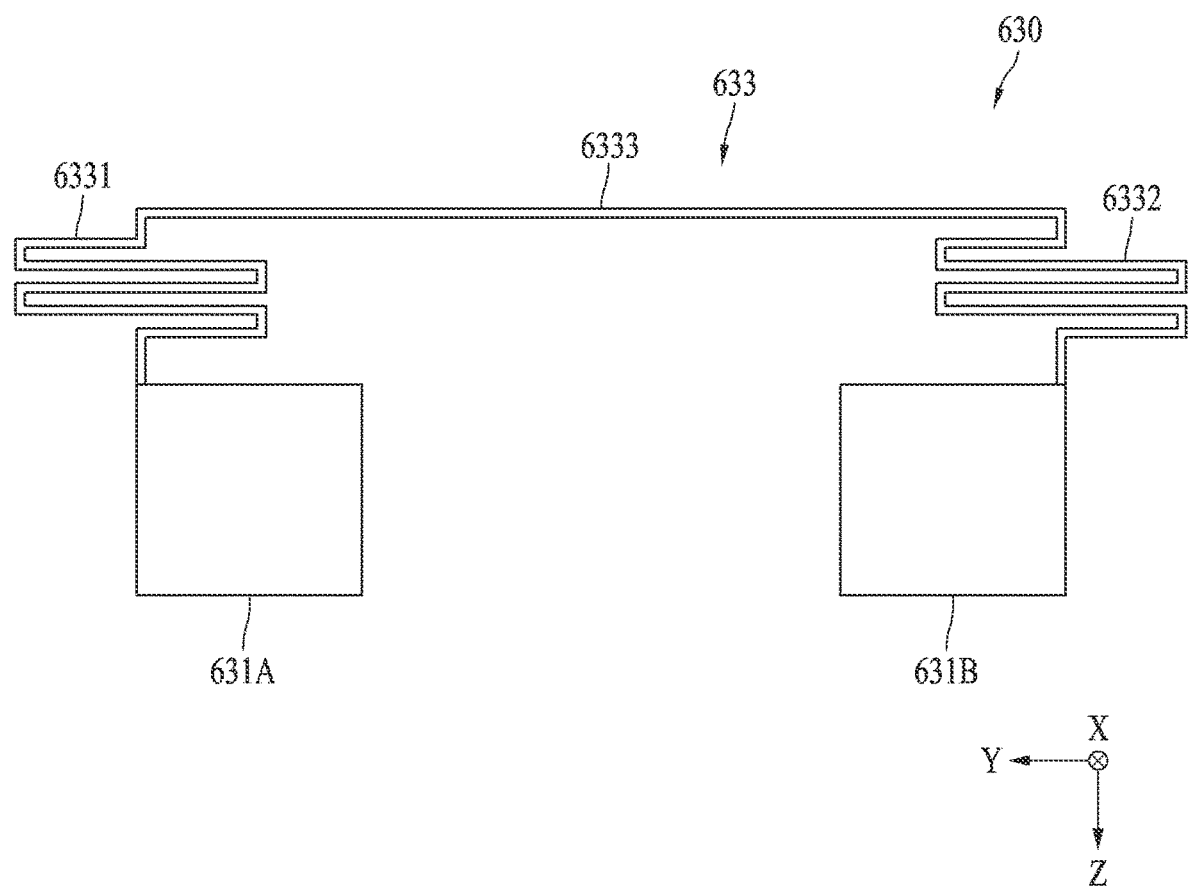
FIG. 6 is a view illustrating a sensor according to an embodiment of the disclosure.

FIG. 6 is a view illustrating a sensor according to an embodiment of the disclosure.

Referring to FIG. 6, a sensor module 630 (e.g., the sensor module 330 of FIGS. 3A to 3D) may include a first capacitive sensor 631A (e.g., the first capacitive sensor 331A and/or the third capacitive sensor 331C), a second capacitive sensor 631B (e.g., the second capacitive sensor 331B and/or the fourth capacitive sensor 331D), and a transmission line 633 (e.g., the transmission lines 333 and 334) that connects the first capacitive sensor 631A and the second capacitive sensor 631B.

The transmission line 633 may include a first line 6331 (e.g., the first line 3331), a second line 6332 (e.g., the second line 3332), and a third line 6333 (e.g., the third line 3333). For convenience of description, the first line 6331, the second line 6332, and the third line 6333 are on one plane (e.g., a YZ plane) as illustrated in FIG. 6, however, this is merely an example. For example, the first line 6331, the second line 6332, and the third line 6333 may form a 3D connection structure, as shown in FIGS. 3A to 3D.

The first line 6331 and/or the second line 6332 may at least partially include a meandering pattern. One end portion of a meandering pattern in the first line 6331 and one end portion of a meandering pattern in the second line 6332 may be connected to a corner of the first capacitive sensor 631A and a corner of the second capacitive sensor 631B, respectively.

Figure 7:
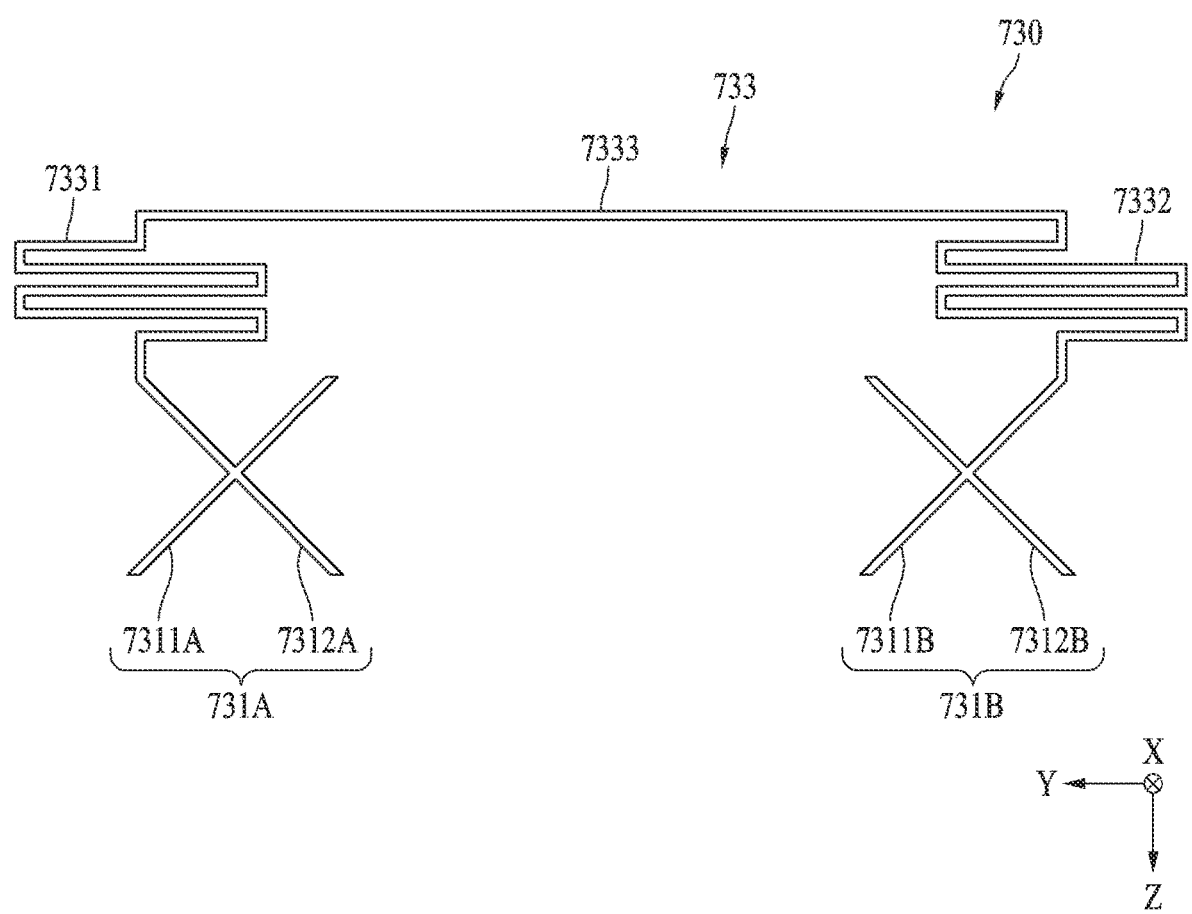
FIG. 7 is a view illustrating a sensor according to an embodiment of the disclosure.

FIG. 7 is a view illustrating a sensor according to an embodiment of the disclosure.

Referring to FIG. 7, a sensor module 730 (e.g., the sensor module 330 of FIGS. 3A to 3D) may include a first capacitive sensor 731A (e.g., the first capacitive sensor 331A and/or the third capacitive sensor 331C), a second capacitive sensor 731B (e.g., the second capacitive sensor 331B and/or the fourth capacitive sensor 331D), and a transmission line 733 (e.g., the transmission lines 333 and 334) that connects the first capacitive sensor 731A and the second capacitive sensor 731B.

The transmission line 733 may include a first line 7331 (e.g., the first line 3331), a second line 7332 (e.g., the second line 3332), and a third line 7333 (e.g., the third line 3333). The first line 7331 and/or the second line 7332 may at least partially include a meandering pattern. For convenience of description, the first line 7331, the second line 7332, and the third line 7333 are on one plane (e.g., a YZ plane) as illustrated in FIG. 7, however, this is merely an example. For example, the first line 7331, the second line 7332, and the third line 7333 may form a 3D connection structure, as shown in FIGS. 3A to 3D.

The first capacitive sensor 731A may include a first conductive extension 7311A that extends in a first diagonal direction (e.g., a direction between the +Y axis and the +Z axis), and a second conductive extension 7312A that is connected to the first line 7331 and that extends in a second diagonal direction (e.g., a direction between the −Y axis and the +Z axis) different from the first diagonal direction. The first conductive extension 7311A and the second conductive extension 7312A may meet each other.

The second capacitive sensor 731B may include a third conductive extension 7311B that is connected to the second line 7332 and that extends in the first diagonal direction (e.g., the direction between the +Y axis and the +Z axis), and a fourth conductive extension 7312B that extends in the second diagonal direction (e.g., a direction between the −Y axis and the +Z axis) different from the first diagonal direction. The third conductive extension 7311B and the fourth conductive extension 7312B may meet each other.

Figure 8:
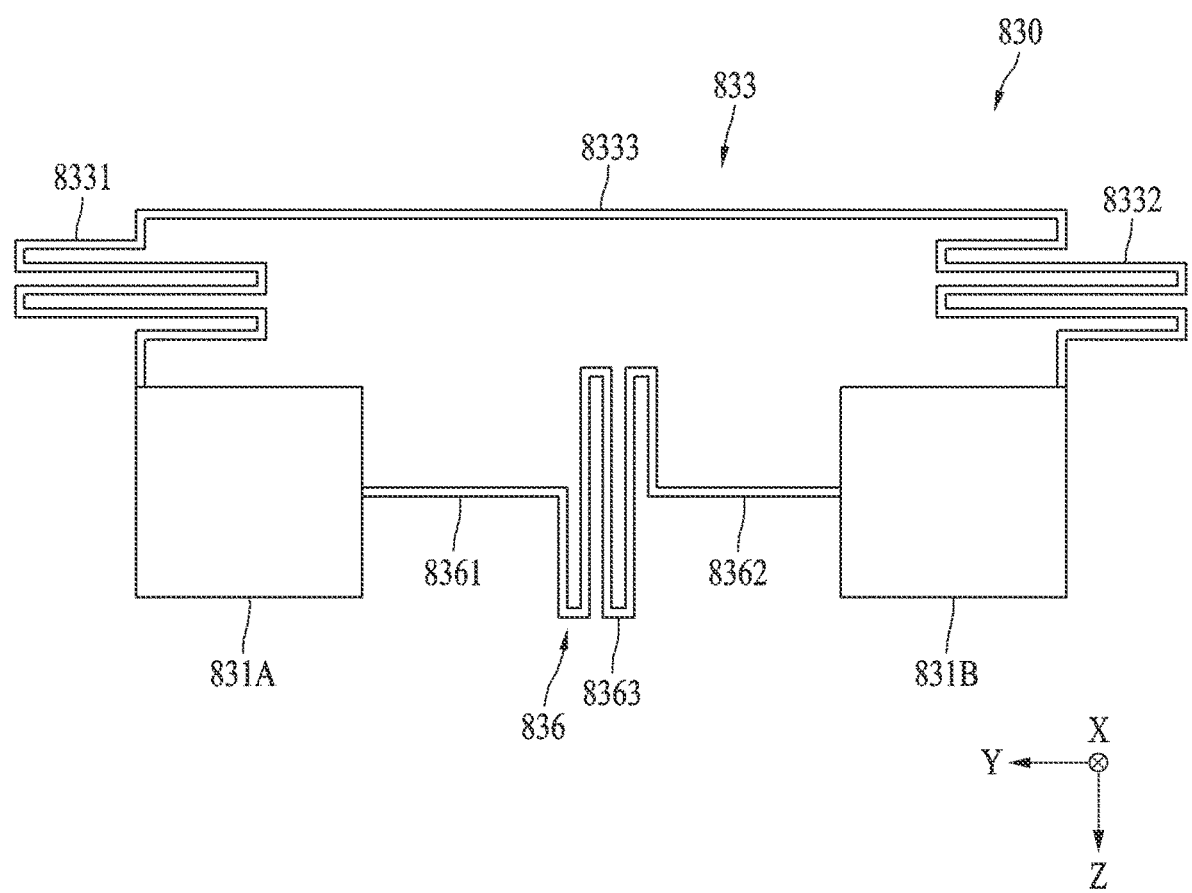
FIG. 8 is a view illustrating a sensor according to an embodiment of the disclosure.

FIG. 8 is a view illustrating a sensor according to an embodiment of the disclosure.

Referring to FIG. 8, a sensor module 830 (e.g., the sensor module 330 of FIGS. 3A to 3D) may include a first capacitive sensor 831A (e.g., the first capacitive sensor 331A and/or the third capacitive sensor 331C), a second capacitive sensor 831B (e.g., the second capacitive sensor 331B and/or the fourth capacitive sensor 331D), a first transmission line 833 (e.g., the transmission lines 333 and 334) that connects the first capacitive sensor 831A and the second capacitive sensor 831B, and a second transmission line 836 (e.g., the second transmission line 437 of FIG. 4).

The first transmission line 833 may include a first line 8331 (e.g., the first line 3331), a second line 8332 (e.g., the second line 3332), and a third line 8333 (e.g., the third line 3333). For convenience of description, the first line 8331, the second line 8332, and the third line 8333 are on one plane (e.g., a YZ plane) as illustrated in FIG. 8, however, this is merely an example. For example, the first line 8331, the second line 8332, and the third line 8333 may form a 3D connection structure, as shown in FIGS. 3A to 3D.

The first line 8331 and/or the second line 8332 may at least partially include a meandering pattern. One end portion of a meandering pattern in the first line 8331 and one end portion of a meandering pattern in the second line 8332 may be connected to a corner of the first capacitive sensor 831A and a corner of the second capacitive sensor 831B, respectively.

The second transmission line 836 may include a first connection line 8361 connected to the first capacitive sensor 831A, a second connection line 8362 connected to the second capacitive sensor 831B, and a third connection line 8363 that connects the first connection line 8361 and the second connection line 8362. The second transmission line 836 may increase a total sensing area of the first capacitive sensor 831A and the second capacitive sensor 831B.

The first connection line 8361 may be connected to a central portion of an edge other than an edge connected to the first line 8331 among edges of the first capacitive sensor 831A, and may extend in a first extension direction (e.g., the −Y direction). In an embodiment, the first connection line 8361 may also be connected to a portion other than a central portion of an edge of the first capacitive sensor 831A.

The second connection line 8362 may be connected to a central portion of an edge other than an edge connected to the second line 8332 among edges of the second capacitive sensor 831B, and may extend in a second extension direction (e.g., the +Y direction) different from the first extension direction. In an embodiment, the second connection line 8362 may also be connected to a portion other than a central portion of an edge of the second capacitive sensor 831B.

The third connection line 8363 may at least partially include a meandering pattern. The meandering pattern of the third connection line 8363 may enhance performance of a pole (e.g., a horizontal component pole) of an antenna (e.g., the antenna 397) implemented by the first connection line 8361 and the second connection line 8362.

A position, a length, and/or a width of the meandering pattern of the third connection line 8363 may be set to an arbitrary value suitable to avoid overlapping with an operating frequency band of the antenna (e.g., the antenna 397).

Figure 9:
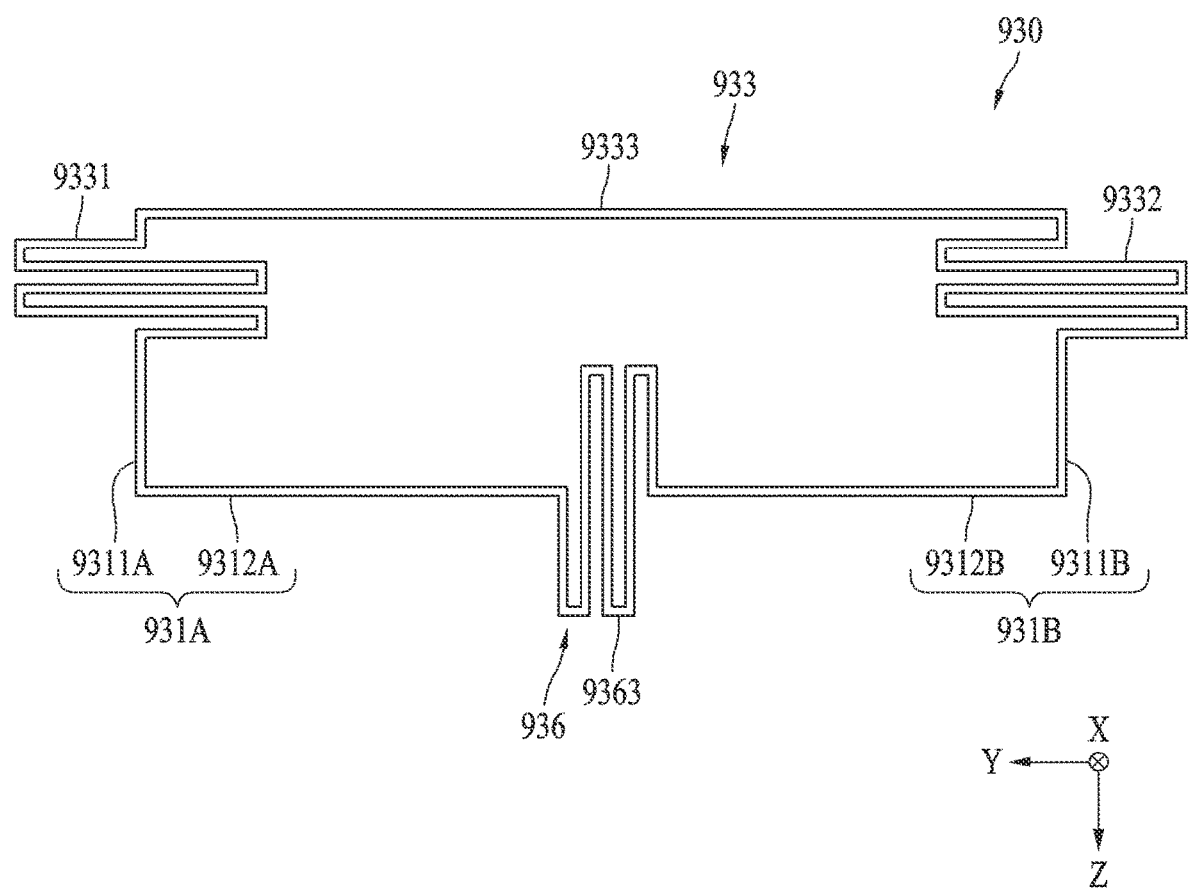
FIG. 9 is a view illustrating a sensor according to an embodiment of the disclosure.

FIG. 9 is a view illustrating a sensor according to an embodiment of the disclosure.

Referring to FIG. 9, a sensor module 930 (e.g., the sensor module 330 of FIGS. 3A to 3D) may include a first capacitive sensor 931A (e.g., the first capacitive sensor 331A and/or the third capacitive sensor 331C), a second capacitive sensor 931B (e.g., the second capacitive sensor 331B and/or the fourth capacitive sensor 331D), a first transmission line 933 (e.g., the transmission lines 333 and 334) that connects the first capacitive sensor 931A and the second capacitive sensor 931B, and a second transmission line 936 (e.g., the second transmission line 836). The second transmission line 936 comprises a connection line 9363 (e.g., the third connection line 8363).

The transmission line 933 may include a first line 9331 (e.g., the first line 3331), a second line 9332 (e.g., the second line 3332), and a third line 9333 (e.g., the third line 3333). The first line 9331 and/or the second line 9332 may at least partially include a meandering pattern. For convenience of description, the first line 9331, the second line 9332, and the third line 9333 are on one plane (e.g., a YZ plane) as illustrated in FIG. 9, however, this is merely an example. For example, the first line 9331, the second line 9332, and the third line 9333 may form a 3D connection structure, as shown in FIGS. 3A to 3D.

The first capacitive sensor 931A may include a first longitudinal extension 9311A that is connected to the first line 9331 and that extends in a first longitudinal direction (e.g., the +/−Z direction), and a second longitudinal extension 9312A that is connected to the first longitudinal extension 9311A and that extends in a second longitudinal direction (e.g., the +/−Y direction) crossing the first longitudinal direction.

The second capacitive sensor 931B may include a third longitudinal extension 9311B that is connected to the second line 9332 and that extends in a third longitudinal direction (e.g., the +/−Z direction), and a fourth longitudinal extension 9312B that is connected to the third longitudinal extension 9311B and that extends in a fourth longitudinal direction (e.g., the +/−Y direction) crossing the third longitudinal direction.

The first capacitive sensor 931A and the second capacitive sensor 931B may reduce an area that overlaps patches (e.g., the patches 392) of an antenna (e.g., the antenna 397) on which the first capacitive sensor 931A and the second capacitive sensor 931B are positioned, and may increase a sensing sensitivity.

Figure 10:
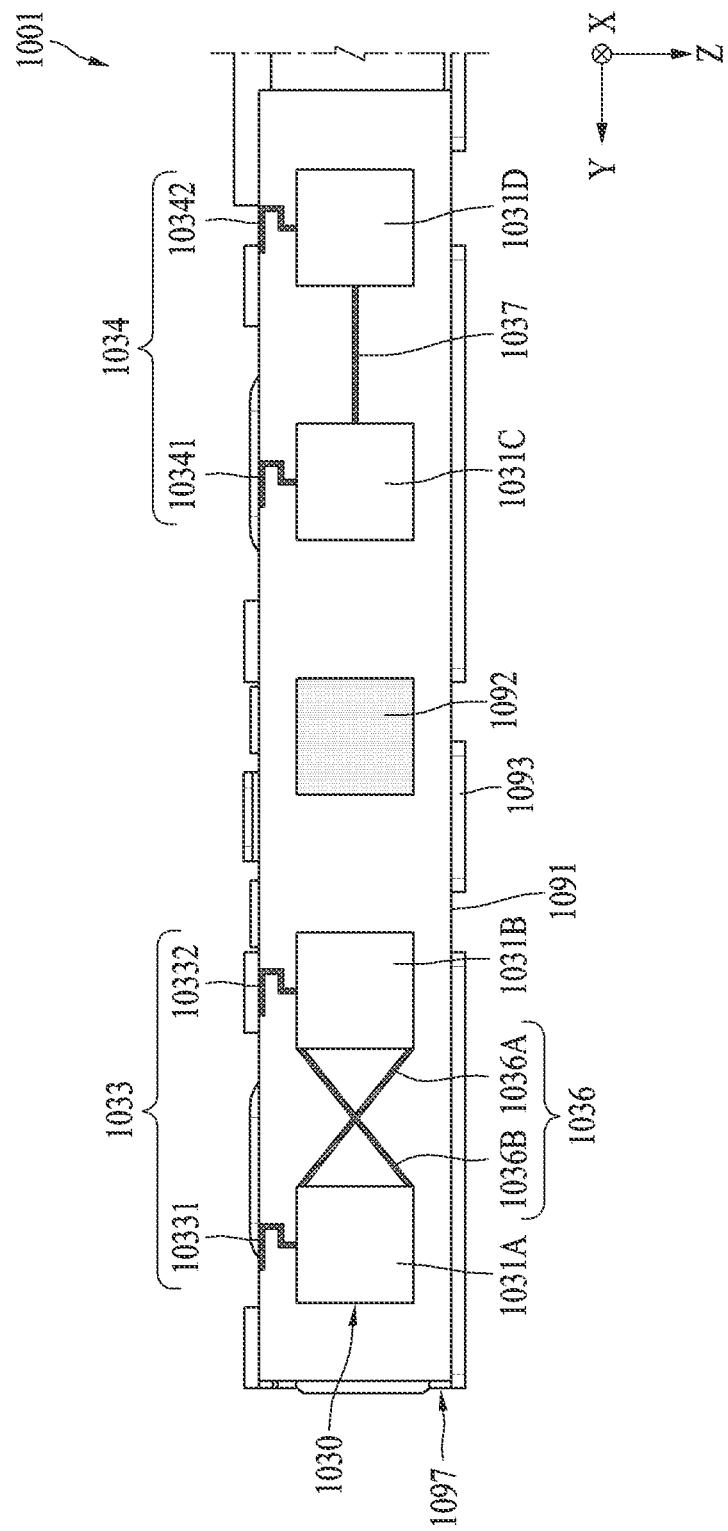
FIG. 10 is a view illustrating an antenna and a sensor according to an embodiment of the disclosure.

FIG. 10 is a view illustrating an antenna and a sensor according to an embodiment of the disclosure.

Referring to FIG. 10, an electronic device 1001 (e.g., the electronic device 301 of FIGS. 3A to 3D) may include an antenna 1097 (e.g., the antenna 397), and a sensor module 1030 (e.g., the sensor module 330).

The antenna 1097 may include a carrier 1091 (e.g., the carrier 391), a plurality of patches 1092 (e.g., the patches 392), and a support body 1093 (e.g., the support body 393).

The sensor module 1030 may include a plurality of capacitive sensors 1031A, 1031B, 1031C, and 1031D (e.g., the capacitive sensors 331A, 331B, 331C, and 331D), a pair of first transmission lines 1033 and 1034 (e.g., the transmission lines 333 and 334), and a pair of second transmission lines 1036 and 1037.

One first transmission line 1033 of the pair of first transmission lines 1033 and 1034 may include a first line 10331 (e.g., the first line 3331) and a second line 10332 (e.g., the second line 3332), and the other first transmission line 1034 may include a fourth line 10341 (e.g., the fourth line 3341) and a fifth line 10342 (e.g., the fifth line 3342).

One second transmission line 1036 of the pair of second transmission lines 1036 and 1037 may include a first conductive extension 1036A that connects a first corner portion of a first capacitive sensor 1031A and a first corner portion of a second capacitive sensor 1031B and that extends in a first diagonal direction (e.g., a direction between the −Y axis and the +Z axis), and a second conductive extension 1036B that connects a second corner portion of the first capacitive sensor 1031A and a second corner portion of the second capacitive sensor 1031B and that extends in a second diagonal direction (e.g., a direction between the +Y axis and the +Z axis) different from the first diagonal direction. The first conductive extension 1036A and the second conductive extension 1036B may meet each other.

The other second transmission line 1037 of the pair of second transmission lines 1036 and 1037 may connect an edge of a third capacitive sensor 1031C and an edge of a fourth capacitive sensor 1031D and may extend in one direction (e.g., the +/−Y direction) between the third capacitive sensor 1031C and the fourth capacitive sensor 1031D.

In contrast to the embodiment illustrated in FIG. 10, a structure of the one second transmission line 1036 of the pair of second transmission lines 1036 and 1037 may also be applied to a structure of the other second transmission line 1037, and vice versa.

Figure 11:
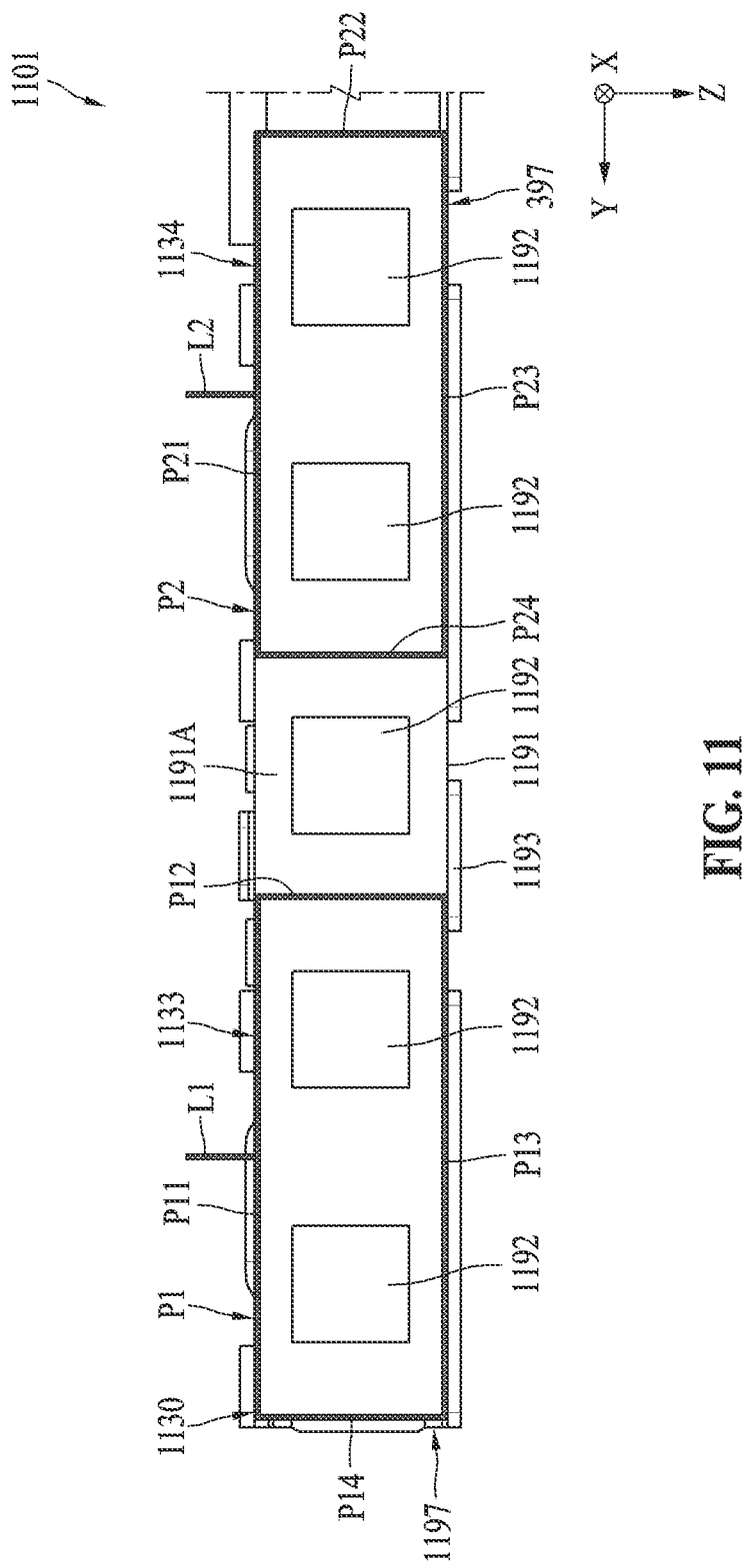
FIG. 11 is a view illustrating an antenna and a sensor according to an embodiment of the disclosure.

FIG. 11 is a view illustrating an antenna and a sensor according to an embodiment of the disclosure.

Referring to FIG. 11, an electronic device 1101 (e.g., the electronic device 301 of FIGS. 3A to 3D) may include an antenna 1197 (e.g., the antenna 397), and a sensor module 1130 (e.g., the sensor module 330).

The antenna 1197 may include a carrier 1191 (e.g., the carrier 391), a plurality of patches 1192 (e.g., the patches 392), and a support body 1193 (e.g., the support body 393).

The sensor module 1130 may include a plurality of capacitive sensors 1133 and 1134 (e.g., the capacitive sensors 331A, 331B, 331C, and 331D), and a pair of transmission lines L1 and L2 (e.g., the transmission lines 333 and 334).

A first capacitive sensor 1133 may include a first conductive perimeter P1 configured to form a closed loop by surrounding a plurality of (e.g., two) patches 1192 positioned in a first portion (e.g., a left portion) on a first carrier surface 1191A. The first conductive perimeter P1 may include a first perimeter portion P11 that surrounds a first side (e.g., an upper side) of the plurality of patches 1192 and that extends in a first direction (e.g., the +/−Y direction), a second perimeter portion P12 that is connected to the first perimeter portion P11, that surrounds a second side (e.g., a right side) of the plurality of patches 1192 and that extends in a second direction (e.g., the +/−Z direction), a third perimeter portion P13 that is connected to the second perimeter portion P12, that surrounds a third side (e.g., a lower side) of the plurality of patches 1192 and that extends in the first direction, and a fourth perimeter portion P14 that is connected to the first perimeter portion P11 and the third perimeter portion P13, that surrounds a fourth side (e.g., a left side) of the plurality of patches 1192 and that extends in the second direction.

A second capacitive sensor 1134 may include a second conductive perimeter P2 configured to form a closed loop by surrounding a plurality of (e.g., two) patches 1192 positioned in a second portion (e.g., a right portion) on the first carrier surface 1191A. The second conductive perimeter P2 may include a fifth perimeter portion P21 that surrounds a first side (e.g., an upper side) of the plurality of patches 1192 and that extends in the first direction (e.g., the +/−Y direction), a sixth perimeter portion P22 that is connected to the fifth perimeter portion P21, that surrounds a second side (e.g., a right side) of the plurality of patches 1192 and that extends in the second direction (e.g., the +/−Z direction), a seventh perimeter portion P23 that is connected to the sixth perimeter portion P22, that surrounds a third side (e.g., a lower side) of the plurality of patches 1192 and that extends in the first direction, and an eighth perimeter portion P24 that is connected to the seventh perimeter portion P23 and the fifth perimeter portion P21, that surrounds a fourth side (e.g., a left side) of the plurality of patches 1192 and that extends in the second direction.

The plurality of capacitive sensors 1133 and 1134 may be spaced apart from each other with at least one patch 1192 interposed therebetween.

The plurality of capacitive sensors 1133 and 1134 may substantially be formed in a square ring shape, which may lead to a reduction in an influence on the antenna 1197.

The pair of transmission lines L1 and L2 may be connected to the first perimeter portion P11 and the fifth perimeter portion P21, respectively.

The pair of transmission lines L1 and L2 are on the same plane (e.g., a YZ plane) as the plurality of capacitive sensors 1133 and 1134, as shown in FIG. 11, however, this is merely an example. It may be understood that the pair of transmission lines L1 and L2 may form a 3D structure positioned in a plane (e.g., an XY plane) that is at least partially different from a plane in which the plurality of capacitive sensors 1133 and 1134 are positioned, as shown in FIGS. 3A to 3D.

Figure 12:
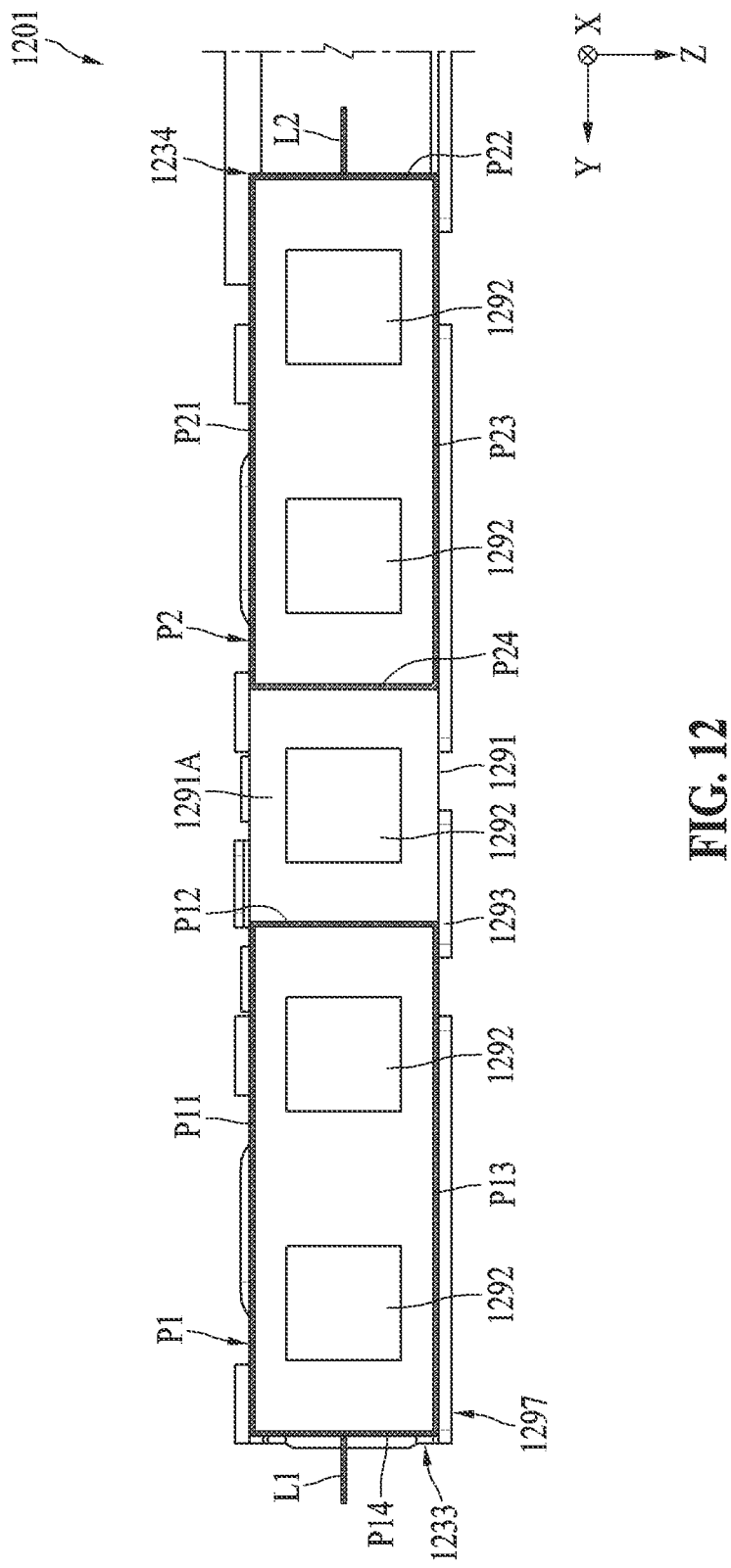
FIG. 12 is a view illustrating an antenna and a sensor according to an embodiment of the disclosure.

FIG. 12 is a view illustrating an antenna and a sensor according to an embodiment of the disclosure.

Referring to FIG. 12, an electronic device 1201 (e.g., the electronic device 301 of FIGS. 3A to 3D) may include an antenna 1297 (e.g., the antenna 397), and a sensor module (e.g., the sensor module 330).

The antenna 1297 may include a carrier 1291 (e.g., the carrier 391), a plurality of patches 1292 (e.g., the patches 392), and a support body 1293 (e.g., the support body 393).

The sensor module may include a plurality of capacitive sensors 1233 and 1234 (e.g., the capacitive sensors 331A, 331B, 331C, and 331D), and a pair of transmission lines L1 and L2 (e.g., the transmission lines 333 and 334).

The first capacitive sensor 1233 may include a first conductive perimeter P1 configured to form a closed loop by surrounding a plurality of (e.g., two) patches 1292 positioned in a first portion (e.g., a left portion) on a first carrier surface 1291A. The first conductive perimeter P1 may include a first perimeter portion P11 that surrounds a first side (e.g., an upper side) of the plurality of patches 1292 and that extends in a first direction (e.g., the +/−Y direction), a second perimeter portion P12 that is connected to the first perimeter portion P11, that surrounds a second side (e.g., a right side) of the plurality of patches 1292 and that extends in a second direction (e.g., the +/−Z direction), a third perimeter portion P13 that is connected to the second perimeter portion P12, that surrounds a third side (e.g., a lower side) of the plurality of patches 1292 and that extends in the first direction, and a fourth perimeter portion P14 that is connected to the first perimeter portion P11 and the third perimeter portion P13, that surrounds a fourth side (e.g., a left side) of the plurality of patches 1292 and that extends in the second direction.

The second capacitive sensor 1234 may include a second conductive perimeter P2 configured to form a closed loop by surrounding a plurality of (e.g., two) patches 1292 positioned in a second portion (e.g., a right portion) on the first carrier surface 1291A. The second conductive perimeter P2 may include a fifth perimeter portion P21 that surrounds the first side (e.g., the upper side) of the plurality of patches 1292 and that extends in the first direction (e.g., the +/−Y direction), a sixth perimeter portion P22 that is connected to the fifth perimeter portion P21, that surrounds the second side (e.g., the right side) of the plurality of patches 1292 and that extends in the second direction (e.g., the +/−Z direction), a seventh perimeter portion P23 that is connected to the sixth perimeter portion P22, that surrounds the third side (e.g., the lower side) of the plurality of patches 1292 and that extends in the first direction, and an eighth perimeter portion P24 that is connected to the fifth perimeter portion P21 and the seventh perimeter portion P23, that surrounds the fourth side (e.g., the left side) of the plurality of patches 1292 and that extends in the second direction.

The plurality of capacitive sensors 1233 and 1234 may be spaced apart from each other with at least one patch 1292 interposed therebetween.

The pair of transmission lines L1 and L2 may be connected to the fourth perimeter portion P14 and the sixth perimeter portion P22, respectively.

The pair of transmission lines L1 and L2 are on the same plane (e.g., a YZ plane) as the plurality of capacitive sensors 1233 and 1234, as shown in FIG. 12, however, this is merely an example. It may be understood that the pair of transmission lines L1 and L2 may form a 3D structure positioned in a plane (e.g., an XZ plane) that is at least partially different from a plane in which the plurality of capacitive sensors 1233 and 1234 are positioned, as shown in FIGS. 3A to 3D.

Figure 13:
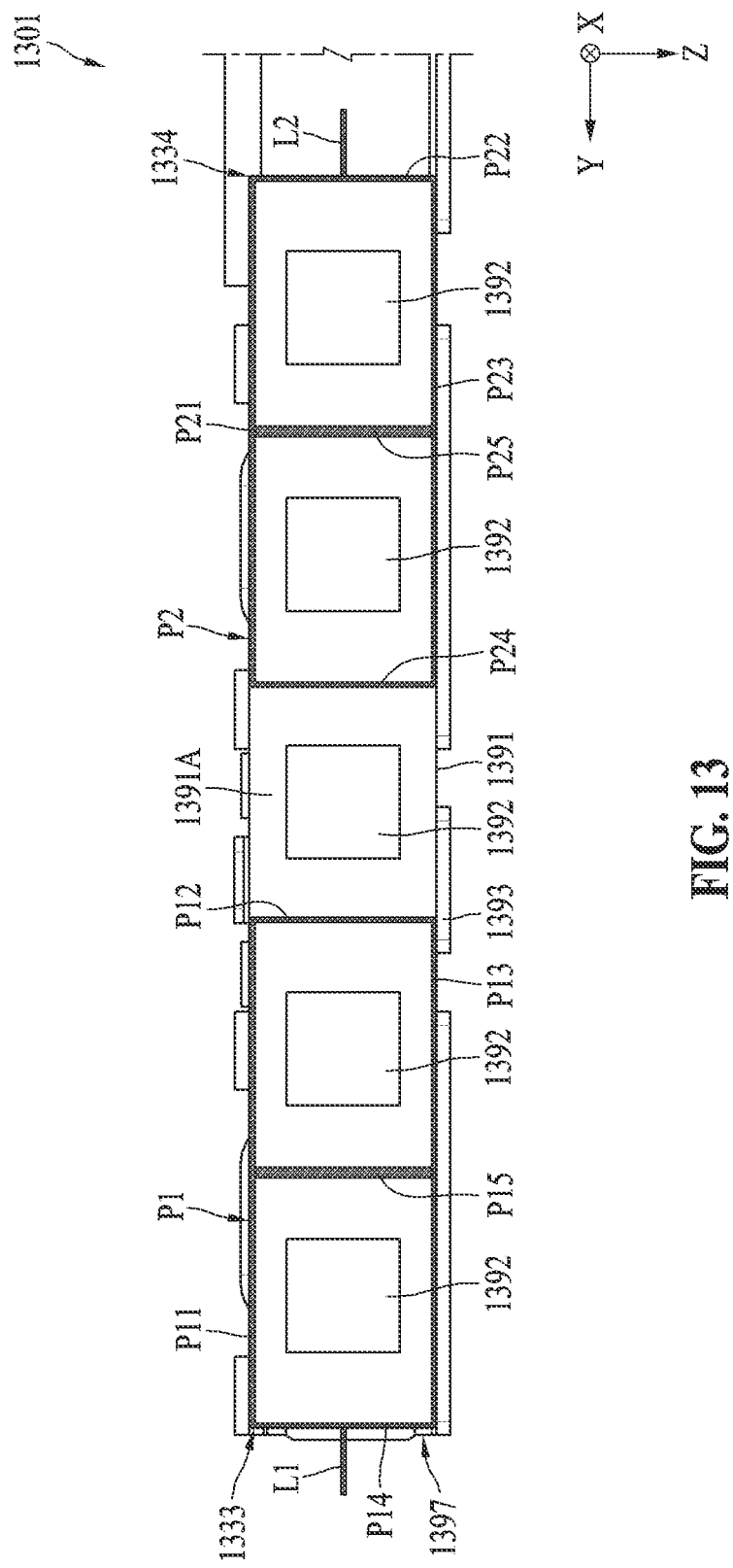
FIG. 13 is a view illustrating an antenna and a sensor according to an embodiment of the disclosure.

FIG. 13 is a view illustrating an antenna and a sensor according to an embodiment of the disclosure.

Referring to FIG. 13, an electronic device 1301 (e.g., the electronic device 301 of FIGS. 3A to 3D) may include an antenna 1397 (e.g., the antenna 397), and a sensor module (e.g., the sensor module 330).

The antenna 1397 may include a carrier 1391 (e.g., the carrier 391), a plurality of patches 1392 (e.g., the patches 392), and a support body 1393 (e.g., the support body 393).

The sensor module may include a plurality of capacitive sensors 1333 and 1334 (e.g., the capacitive sensors 331A, 331B, 331C, and 331D), and a pair of transmission lines L1 and L2 (e.g., the transmission lines 333 and 334).

A first capacitive sensor 1333 may include a first conductive perimeter P1 configured to form a closed loop by surrounding a plurality of (e.g., two) patches 1392 positioned in a first portion (e.g., a left portion) on a first carrier surface 1391A. The first conductive perimeter P1 may include a first perimeter portion P11 that surrounds a first side (e.g., an upper side) of the plurality of patches 1392 and that extends in a first direction (e.g., the +/−Y direction), a second perimeter portion P12 that is connected to the first perimeter portion P11, that surrounds a second side (e.g., a right side) of the plurality of patches 1392 and that extends in a second direction (e.g., the +/−Z direction), a third perimeter portion P13 that is connected to the second perimeter portion P12, that surrounds a third side (e.g., a lower side) of the plurality of patches 1392 and that extends in the first direction, a fourth perimeter portion P14 that is connected to the first perimeter portion P11 and the third perimeter portion P13, that surrounds a fourth side (e.g., a left side) of the plurality of patches 1392 and that extends in the second direction, and a first bridge P15 that connects the first perimeter portion P11 and the third perimeter portion P13 and that extends between the first perimeter portion P11 and the third perimeter portion P13 across the plurality of patches 1392.

A second capacitive sensor 1334 may include a second conductive perimeter P2 configured to form a closed loop by surrounding a plurality of (e.g., two) patches 1392 positioned in a second portion (e.g., a right portion) on the first carrier surface 1391A. The second conductive perimeter P2 may include a fifth perimeter portion P21 that surrounds the first side (e.g., the upper side) of the plurality of patches 1392 and that extends in the first direction (e.g., the +/−Y direction), a sixth perimeter portion P22 that is connected to the fifth perimeter portion P21, that surrounds the second side (e.g., the right side) of the plurality of patches 1392 and that extends in the second direction (e.g., the +/−Z direction), a seventh perimeter portion P23 that is connected to the sixth perimeter portion P22, that surrounds the third side (e.g., the lower side) of the plurality of patches 1392 and that extends in the first direction, an eighth perimeter portion P24 that is connected to the fifth perimeter portion P21 and the seventh perimeter portion P23, that surrounds the fourth side (e.g., the left side) of the plurality of patches 1392 and that extends in the second direction, and a second bridge P25 that connects the fifth perimeter portion P21 and the seventh perimeter portion P23 and that extends between the fifth perimeter portion P21 and the seventh perimeter portion P23 across the plurality of patches 1392.

The plurality of capacitive sensors 1333 and 1334 may be spaced apart from each other with at least one patch 1392 interposed therebetween.

The pair of transmission lines L1 and L2 may be connected to the fourth perimeter portion P14 and the sixth perimeter portion P22, respectively.

The pair of transmission lines L1 and L2 are on the same plane (e.g., a YZ plane) as the plurality of capacitive sensors 1333 and 1334, as shown in FIG. 13, however, this is merely an example. It may be understood that the pair of transmission lines L1 and L2 may form a 3D structure positioned in a plane (e.g., an XZ plane) that is at least partially different from a plane in which the plurality of capacitive sensors 1333 and 1334 are positioned, as shown in FIGS. 3A to 3D.

Figure 14:
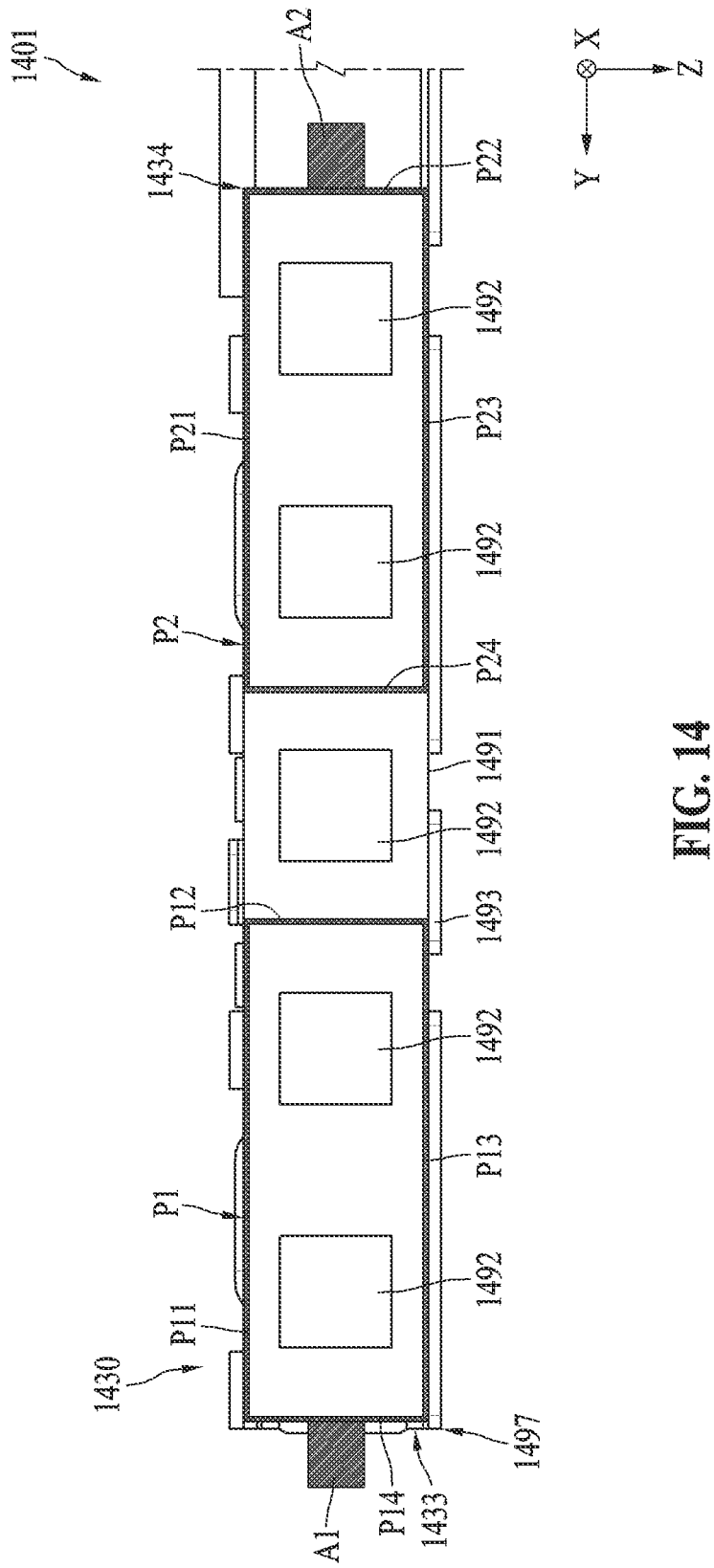
FIG. 14 is a view illustrating an antenna and a sensor according to an embodiment of the disclosure.

FIG. 14 is a view illustrating an antenna and a sensor according to an embodiment of the disclosure.

Referring to FIG. 14, an electronic device 1401 (e.g., the electronic device 301 of FIGS. 3A to 3D) according to an embodiment may include an antenna 1497 (e.g., the antenna 397), and a sensor module 1430 (e.g., the sensor module 330).

The antenna 1497 may include a carrier 1491 (e.g., the carrier 391), a plurality of patches 1492 (e.g., the patches 392), and a support body 1493 (e.g., the support body 393).

The sensor module 1430 may include a plurality of capacitive sensors 1433 and 1434 (e.g., the capacitive sensors 331A, 331B, 331C, and 331D).

A first capacitive sensor 1433 may include a first conductive perimeter P1 configured to form a closed loop by surrounding a plurality of (e.g., two) patches 1492 positioned in a first portion (e.g., a left portion) on a first carrier surface 1491A. The first conductive perimeter P1 may include a first perimeter portion P11 that surrounds a first side (e.g., an upper side) of the plurality of patches 1492 and that extends in a first direction (e.g., the +/−Y direction), a second perimeter portion P12 that is connected to the first perimeter portion P11, that surrounds a second side (e.g., a right side) of the plurality of patches 1492 and that extends in a second direction (e.g., the +/−Z direction), a third perimeter portion P13 that is connected to the second perimeter portion P12, that surrounds a third side (e.g., a lower side) of the plurality of patches 1492 and that extends in the first direction, and a fourth perimeter portion P14 that is connected to the first perimeter portion P11 and the third perimeter portion P13, that surrounds a fourth side (e.g., a left side) of the plurality of patches 1492 and that extends in the second direction.

A second capacitive sensor 1434 may include a second conductive perimeter P2 configured to form a closed loop by surrounding a plurality of (e.g., two) patches 1492 positioned in a second portion (e.g., a right portion) on the first carrier surface 1491A. The second conductive perimeter P2 may include a fifth perimeter portion P21 that surrounds the first side (e.g., the upper side) of the plurality of patches 1492 and that extends in the first direction (e.g., the +/−Y direction), a sixth perimeter portion P22 that is connected to the fifth perimeter portion P21, that surrounds the second side (e.g., the right side) of the plurality of patches 1492 and that extends in the second direction (e.g., the +/−Z direction), a seventh perimeter portion P23 that is connected to the sixth perimeter portion P22, that surrounds the third side (e.g., the lower side) of the plurality of patches 1492 and that extends in the first direction, and an eighth perimeter portion P24 that is connected to the fifth perimeter portion P21 and the seventh perimeter portion P23, that surrounds the fourth side (e.g., the left side) of the plurality of patches 1492 and that extends in the second direction.

The plurality of capacitive sensors 1433 and 1434 may be spaced apart from each other with at least one patch 1492 interposed therebetween.

The sensor module 1430 may include a first conductive junction A1 (e.g., the transmission line 333) that electrically connects the first capacitive sensor 1433 to a circuit board, and a second conductive junction A2 (e.g., the transmission line 334) that electrically connects the second capacitive sensor 1434 to the circuit board capacitive sensor 1434.

The first conductive junction A1 may be connected to the fourth perimeter portion P14. The first conductive junction A1 may be connected to the first perimeter portion P11 or the third perimeter portion P13.

The second conductive junction A2 may be connected to the sixth perimeter portion P21. The second conductive junction A2 may be connected to the fifth perimeter portion P21 or the seventh perimeter portion P23.

The first conductive junction A1 and the second conductive junction A2 may comprise a conductive pad. For example, the first conductive junction A1 and the second conductive junction A2 may be formed using metal inserts by laser directing structuring (LDS).

The first conductive junction A1 and the second conductive junction A2 are on the same plane (e.g., a YZ plane) as the plurality of capacitive sensors 1433 and 1434, as shown in FIG. 14, however, this is merely an example. It may be understood that the first conductive junction A1 and the second conductive junction A2 may be positioned in a plane (e.g., an XZ plane) that is at least partially different from a plane in which the plurality of capacitive sensors 1433 and 1434 are positioned, to form a 3D structure together with the plurality of capacitive sensors 1433 and 1434.

Figure 15:
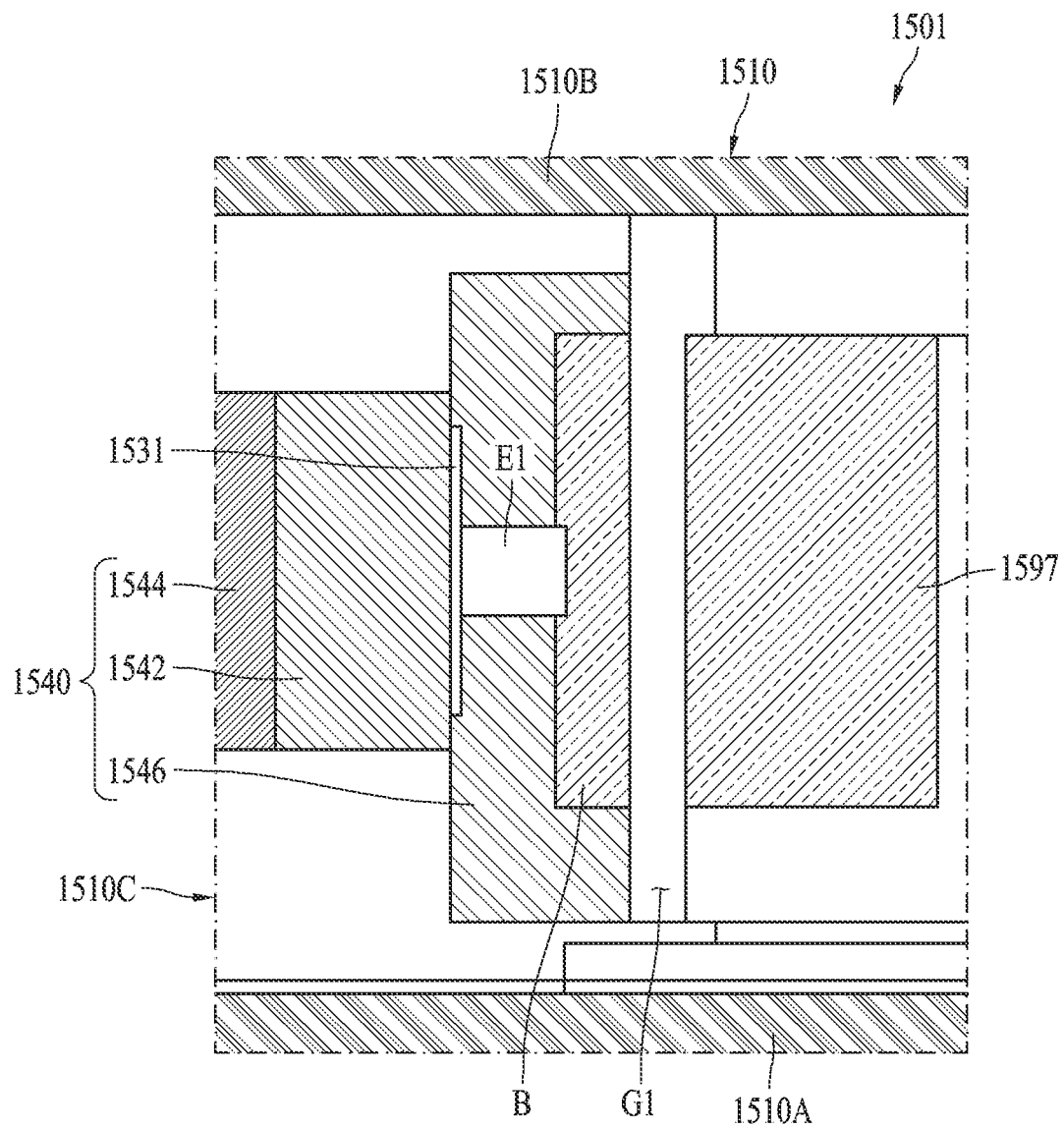
FIG. 15 is a view of an antenna and a sensor arranged in an electronic device viewed in one direction according to an embodiment of the disclosure.

FIG. 15 is a view of an antenna and a sensor arranged in an electronic device viewed in one direction according to an embodiment of the disclosure.

FIG. 15 illustrates an electronic device 1501 (e.g., the electronic device 301 of FIGS. 3A to 3D) viewed in one direction (e.g., the +/−Y direction in FIG. 3A) on an XZ plane. Referring to FIG. 15, an electronic device 1501 may include a housing 1510 (e.g., the housing 310) including a first surface 1510A, a second surface 1510B, and a side surface 1510C; an antenna 1597 (e.g., the antenna 397), a capacitive sensor 1531 (e.g., the capacitive sensors 331A, 331B, 331C, and 331D), and a filler 1540 (e.g., the filler 340). The housing 1510 may include a first surface 1510A (e.g., the first surface 310A), a second surface 1510B (e.g., the second surface 310B), and a side surface 1510C (e.g., the side surface 310C). The capacitive sensor 1531 may include the capacitive sensors 1433 and 1434 of FIG. 14.

The filler 1540 may include a first filler 1542 positioned on the capacitive sensor 1531, and a second filler 1544 positioned between the first filler 1542 and the side surface 1510C.

The housing 1510 may include a conductive insert E1 that electrically connects a conductive junction (e.g., the first conductive junction A1 and/or the second conductive junction A2) of the capacitive sensor 1531 and a circuit board B.

The housing 1510 may include a gap portion G1 between the capacitive sensor 1531 and the antenna 1597. For example, the gap portion G1 may be filled with air. The gap portion G1 and the filler 1540 may increase a sensitivity of the capacitive sensor 1531. The gap portion G1 may be formed between the circuit board B and the antenna 1597.

According to an embodiment of the disclosure, the first filler 1542 and the second filler 1544 may be formed of different materials. According to an embodiment of the disclosure, the first filler 1542 and the second filler 1544 may form a boundary, and may be formed of substantially the same material.

According to an embodiment of the disclosure, a thickness (e.g., a dimension in the +/−X direction) of the first filler 1542 may be greater than a thickness of the second filler 1544. According to an embodiment of the disclosure, the thickness of the first filler 1542 may be substantially equal to or less than the thickness of the second filler 1544.

In the embodiment illustrated in FIG. 15, the filler 1540 may include a third filler 1546 between the antenna 1597 and the capacitive sensor 1531. The third filler 1546 may be positioned on the circuit board B. In an embodiment, the third filler 1546 may be composed of a material that is substantially be the same as a material of the first filler 1542 and/or a material of the second filler 1544. In an embodiment, the third filler 1546 may be composed of a material that is different from the material of the first filler 1542 and/or the material of the second filler 1544.

Figure 16:
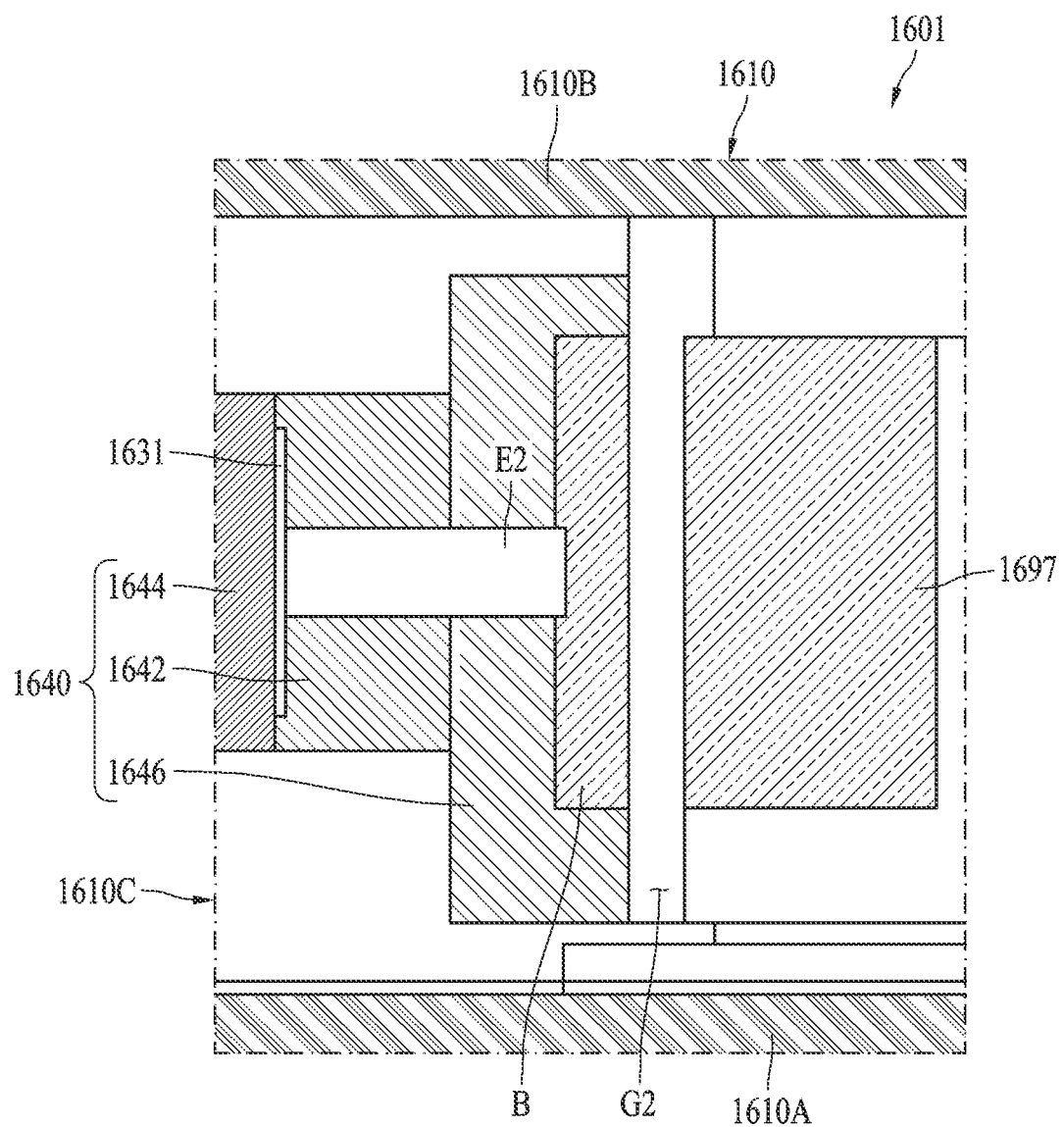
FIG. 16 is a view of an antenna and a sensor arranged in an electronic device viewed in one direction according to an embodiment of the disclosure.

FIG. 16 is a view of an antenna and a sensor arranged in an electronic device viewed in one direction according to an embodiment of the disclosure.

FIG. 16 illustrates an electronic device 1601 (e.g., the electronic device 301 of FIGS. 3A to 3D) viewed in one direction (e.g., the +/−Y direction in FIG. 3A) on an XZ plane. Referring to FIG. 16, the electronic device 1601 (e.g., the electronic device 1501 of FIG. 15) may include a housing 1610 (e.g., the housing 1510), an antenna 1697 (e.g., the antenna 1597), a capacitive sensor 1631 (e.g., the capacitive sensor 1531), and a filler 1640 (e.g., the filler 1540). The housing 1610 may include a first surface 1610A (e.g., the first surface 1510A), a second surface 1610B (e.g., the second surface 1510B), and a side surface 1610C (e.g., the side surface 1510C).

The filler 1640 may include a first filler 1642 (e.g., the first filler 1542) positioned between the capacitive sensor 1631 and one surface (e.g., the first carrier surface 391A) of the antenna 1697, and a second filler 1644 (e.g., the second filler 1544) positioned between the capacitive sensor 1631 and the side surface 1610C. In an embodiment, the filler 1640 may include a third filler 1646 (e.g., the third filler 1546) between the antenna 1597 and the first filler 1642.

The housing 1610 may include a conductive insert E2 (e.g., the conductive insert E1) that electrically connects a conductive junction (e.g., the first conductive junction A1 and/or the second conductive junction A2) of the capacitive sensor 1631 and a circuit board.

The housing 1610 may include a gap portion G2 between the capacitive sensor 1631 and the antenna 1697. For example, the gap portion G2 may be filled with air. The gap portion G2 and the filler 1640 may increase a sensitivity of the capacitive sensor 1631.

Figure 17:
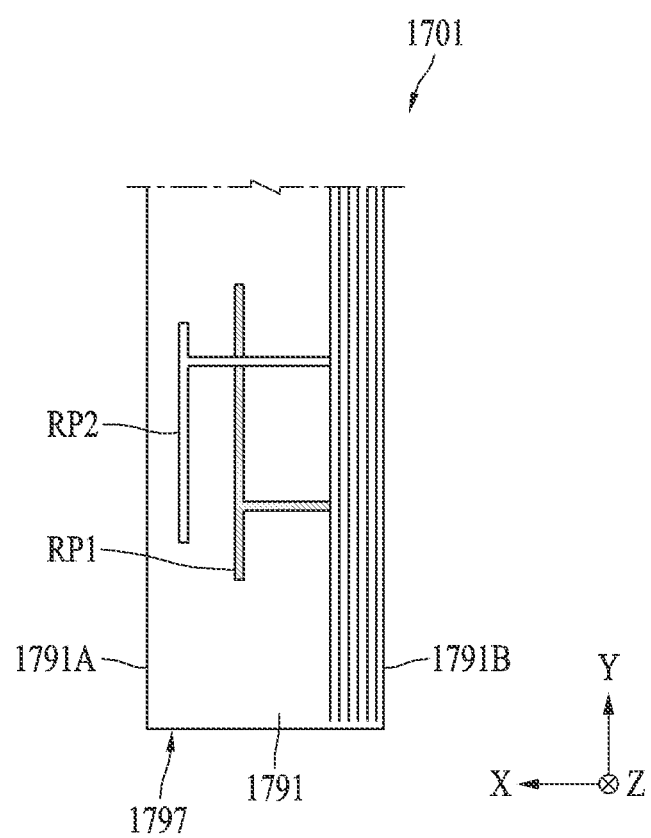
FIG. 17 is a cross-sectional view of an antenna according to an embodiment of the disclosure.

FIG. 17 is a cross-sectional view of an antenna according to an embodiment of the disclosure.

Referring to FIG. 17, an electronic device 1701 (e.g., the electronic device 301 of FIGS. 3A to 3D) may include an antenna 1797 (e.g., the antenna 397). The antenna 1797 may include a carrier 1791 that includes a first carrier surface 1791A (e.g., the first carrier surface 391A) and a second carrier surface 1791B (e.g., the second carrier surface 391B).

The antenna 1797 may include a first patch RP1 and a second patch RP2 embedded in the carrier 1791. The first patch RP1 may be positioned between the first carrier surface 1791A and the second carrier surface 1791B and configured to operate in a first frequency band. The second patch RP2 may be positioned between the first patch RP1 and the first carrier surface 1791A and configured to operate in a second frequency band (e.g., a second frequency band higher than the first frequency band) different from the first frequency band.

The first patch RP1 and/or the second patch RP2 may have a shape of a conductive patch substantially the same as those of the capacitive sensors 331A, 331B, 331C, and 331D described above with reference to FIGS. 3A to 3D.

When the antenna 1797 communicates in the first frequency band, the first patch RP1 may be configured to emit radio waves, and the second patch RP2 may be configured to receive an external input signal from a capacitive sensor. When the antenna 1797 communicates in the second frequency band, the second patch RP2 may be configured to emit radio waves, and the first patch RP1 may be configured to receive an external input signal from a capacitive sensor.

Figure 18:
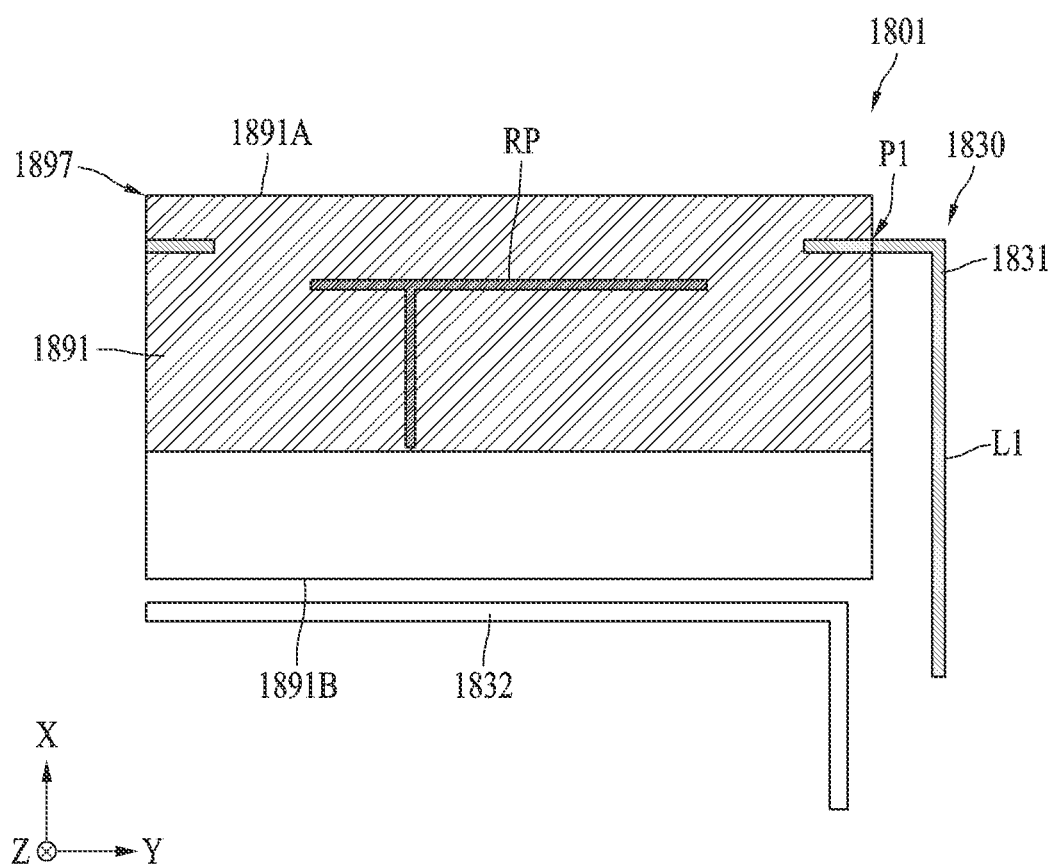
FIG. 18 is a cross-sectional view of an antenna and a sensor according to an embodiment of the disclosure.

FIG. 18 is a cross-sectional view of an antenna and a sensor according to an embodiment of the disclosure.

Referring to FIG. 18, an electronic device 1801 (e.g., the electronic device 1701 of FIG. 17) may include an antenna 1897 (e.g., the antenna 1797), and a sensor module 1830 (e.g., the sensor module 330 of FIGS. 3A to 3D). The antenna 1897 may include a carrier 1891 that includes a first carrier surface 1891A (e.g., the first carrier surface 1791A) and a second carrier surface 1891B (e.g., the second carrier surface 1791B). The sensor module 1830 may include a capacitive sensor 1831 (e.g., the capacitive sensors 331A, 331B, 331C, and 331D), an inductive sensor 1832, and a transmission line L1 (e.g., the transmission lines 333 and 334).

The capacitive sensor 1831 may have a square ring-shaped structure, similarly to the capacitive sensors 1133 and 1134 shown in FIG. 11. At least a portion (e.g., the first conductive perimeter P1 and/or the second conductive perimeter P2) of the capacitive sensor 1831 may be embedded between the first carrier surface 1891A and the second carrier surface 1891B in the carrier 1891.

Figure 19:
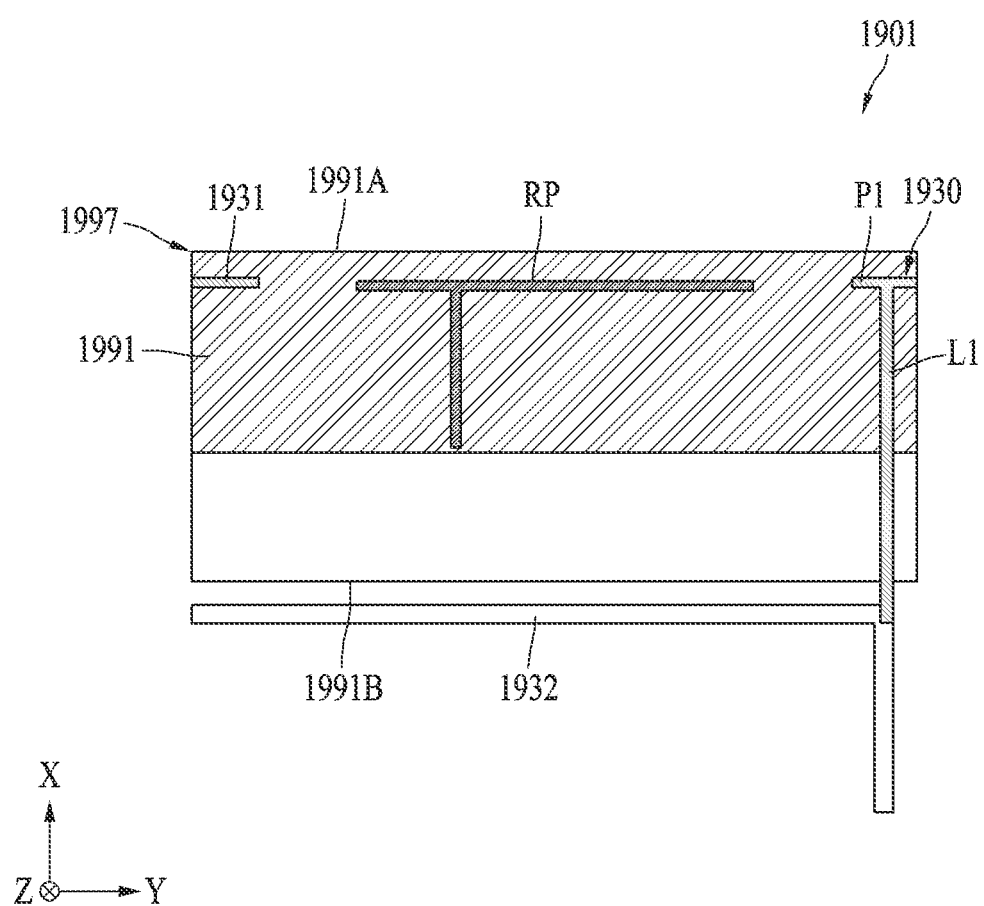
FIG. 19 is a cross-sectional view of an antenna and a sensor according to an embodiment of the disclosure.

FIG. 19 is a cross-sectional view of an antenna and a sensor according to an embodiment of the disclosure.

Referring to FIG. 19, an electronic device 1901 (e.g., the electronic device 1701 of FIG. 17) may include an antenna 1997 (e.g., the antenna 1797), and a sensor module 1930 (e.g., the sensor module 330 of FIGS. 3A to 3D). The antenna 1997 may include a carrier 1991 that includes a first carrier surface 1991A (e.g., the first carrier surface 1791A) and a second carrier surface 1991B (e.g., the second carrier surface 1791B). The antenna 1997 may include a patch RP embedded in the carrier 1991. The sensor module 1930 may include a capacitive sensor 1931 (e.g., the capacitive sensors 331A, 331B, 331C, and 331D), an inductive sensor 1932, and a transmission line L1 (e.g., the transmission lines 333 and 334).

The capacitive sensor 1931 may have a square ring-shaped structure (e.g., the first conductive perimeter P1), similarly to the capacitive sensors 1133 and 1134 shown in FIG. 11. At least a portion (e.g., the first conductive perimeter P1) of the capacitive sensor 1931 may be embedded in the carrier 1991 by surrounding the patch RP. In some embodiments, the capacitive sensor 1931 may form a floating pattern around the patch RP. The transmission line L1, which is A signal line of the floating pattern, may be connected to a connector of the antenna 1997.

An antenna module (e.g., a mmWave module) may be disposed in an area different from an area in which a volume key, a fingerprint key, a subscriber identification module (SIM) slot, and/or another antenna module (e.g., a legacy antenna module) is disposed within an electronic device. An input module for capacitive sensing may be positioned in an injection area in the electronic device. An aspect of the disclosure may provide an electronic device that may enhance a space efficiency of components in the electronic device.

According to an embodiment of the disclosure, an electronic device 301 may include a housing 310 including a first surface 310A, a second surface 310B opposite to the first surface 310A, and a side surface 310C between the first surface 310A and the second surface 310B, an antenna 397 including a carrier 391 that includes a first carrier surface 391A facing the side surface 310C, a second carrier surface 391B opposite to the first carrier surface 391A and a plurality of side carrier surfaces 391C, 391D, and 391E between the first carrier surface 391A and the second carrier surface 391B, and a patch 392 positioned on the first carrier surface 391A, a first capacitive sensor 331A positioned between the first carrier surface 391A and the side surface 310C, and a filler 340 positioned between the side surface 310C and the first carrier surface 391A.

The first capacitive sensor 331A may include a conductive patch that at least partially overlaps the patch 392.

The electronic device 301 may include a second capacitive sensor 331B positioned between the first carrier surface 391A and the side surface 310C, and a first transmission line 333 that is positioned on the first carrier surface 391A and a first side carrier surface 391C among the plurality of side carrier surfaces 391C, 391D, and 391E and that is configured to connect the first capacitive sensor 331A and the second capacitive sensor 331B.

The first transmission line 333 may be integrally connected to the first capacitive sensor 331A and/or the second capacitive sensor 331B.

The first transmission line 333 may be separably connected to the first capacitive sensor 331A and/or the second capacitive sensor 331B.

The first transmission line 333 may include a meandering pattern and/or an element having an inductance.

The first capacitive sensor 331A and the second capacitive sensor 331B may each include a conductive patch. The first transmission line 333 may be connected to an edge of a conductive patch of the first capacitive sensor 331A and an edge of a conductive patch of the second capacitive sensor 331B.

The first capacitive sensor 331A and the second capacitive sensor 331B may each include a conductive patch. The first transmission line 333 may be connected to a corner of a conductive patch of the first capacitive sensor 331A and a corner of a conductive patch of the second capacitive sensor 331B.

The first capacitive sensor 731A may include a first conductive extension 7311A that extends in a first diagonal direction, and a second conductive extension 7312A that extends in a second diagonal direction different from the first diagonal direction and that meets the first conductive extension 7311A.

The electronic device 301 may further include a second transmission line 836 that is positioned on the first carrier surface 391A and that is configured to connect the first capacitive sensor 391A and the second capacitive sensor 391B.

The second transmission line 836 may include a meandering pattern.

The first capacitive sensor 931A may include a first longitudinal extension 9311A that is connected to the first transmission line 933 and that extends in a first longitudinal direction, and a second longitudinal extension 9312A that is connected to the first longitudinal extension 9311A and that extends in a second longitudinal direction crossing the first longitudinal direction. The second capacitive sensor 931B may include a third longitudinal extension 9311B that is connected to the first transmission line 933 and that extends in a third longitudinal direction, and a fourth longitudinal extension 9312B that is connected to the third longitudinal extension 9311B, that extends in a fourth longitudinal direction crossing the third longitudinal direction, and that is electrically connected to the second longitudinal extension 9312A.

The first capacitive sensor 1133 may include a conductive perimeter P1 configured to form a closed loop by surrounding the patch 1192.

The electronic device 1401 may further include a conductive junction A1 connected to the conductive perimeter P1.

The filler 1540 may include a first filler 1542 positioned on the conductive perimeter P1, and a second filler 1544 positioned between the first filler 1542 and the side surface 1510C. The electronic device 1501 may further include a conductive insert E1 that is positioned on one side carrier surface 391E among the plurality of side carrier surfaces 391C, 391D, and 391E and that is electrically connected to the conductive junction A1.

The filler 1640 may include a first filler 1642 positioned between the first carrier surface 391A and the conductive perimeter P1, and a second filler 1644 positioned between the conductive perimeter P1 and the side surface 1610C. The electronic device 1601 may further include a conductive insert E1 that is positioned on one side carrier surface 391E among the plurality of side carrier surfaces 391C, 391D, and 391E and that is electrically connected to the conductive junction A1.

According to an embodiment of the disclosure, an electronic device 301, 1701 may include a housing 310 including a first surface 310A, a second surface 310B opposite to the first surface 310A, and a side surface 310C between the first surface 310A and the second surface 310B, an antenna 1797 including a carrier 1791 that includes a first carrier surface 391A, 1791A facing the side surface 310C and a second carrier surface 391B, 1791B opposite to the first carrier surface 391A, 1791A, a first patch RP1 embedded between the first carrier surface 1791A and the second carrier surface 1791B in the carrier 1791 and configured to operate in a first frequency band, and a second patch RP2 embedded between the first patch RP1 and the first carrier surface 1791A in the carrier 1791 and configured to operate in a second frequency band different from the first frequency band, and a filler 340 between the first carrier surface 391A, 1791A and the side surface 310C.

The first patch RP1 may be configured to receive an external input through the filler 340 when the second patch RP2 operates in the second frequency band. The second patch RP2 may be configured to receive an external input through the filler 340 when the first patch RP1 operates in the first frequency band.

According to an embodiment of the disclosure, an electronic device 301, 1801 may include a housing 310 including a first surface 310A, a second surface 310B opposite to the first surface 310A, and a side surface 310C between the first surface 310A and the second surface 310B, an antenna 1897 including a carrier 391, 1891 that includes a first carrier surface 391A, 1891A facing the side surface 310C and a second carrier surface 391B, 1891B opposite to the first carrier surface 391A, 1891A, and a patch RP embedded between the first carrier surface 1891A and the second carrier surface 1891B in the carrier 1891, a capacitive sensor 1831 embedded between the patch RP and the first carrier surface 1891A in the carrier 1891, and a filler 340 positioned on the side surface 310C.

The capacitive sensor 1931 may include a conductive perimeter Pb configured to form a closed loop by surrounding the patch RP.

According to an embodiment of the disclosure, radiation performance of an antenna and sensing performance of a sensor may be secured to enhance a space efficiency of an electronic device. Accordingly, a design of an electronic device may be improved. An electronic device according to an embodiment of the disclosure may omit a slot for an antenna without reducing performance of an antenna. The effects of an electronic device according to embodiments of the disclosure are not limited to the above-mentioned effects, and other unmentioned effects can be clearly understood from the following description by one of ordinary skill in the art.

While the disclosure has been shown and described with reference to embodiments thereof, it will be understood by those skilled in the art that various changes in form and details may be made therein without departing from the scope of the disclosure as defined by the appended claims and their equivalents. Features of the above described embodiments and aspects can be combined unless their combining results in evident technical conflicts.

What is claimed is:

1. An electronic device comprising:
   a housing comprising a first surface, a second surface opposite to the first surface, and a side surface between the first surface and the second surface;
   an antenna comprising:
   a carrier, the carrier comprising:
   a first carrier surface facing the side surface,
   a second carrier surface opposite to the first carrier surface, and
   a plurality of side carrier surfaces between the first carrier surface and the second carrier surface, and
   a patch positioned on the first carrier surface;
   a first capacitive sensor positioned between the first carrier surface and the side surface; and
   a filler positioned between the side surface and the first carrier surface.

2. The electronic device of claim 1, wherein the first capacitive sensor comprises a conductive patch that at least partially overlaps the patch.

3. The electronic device of claim 1, further comprising:
   a second capacitive sensor positioned between the first carrier surface and the side surface; and
   a first transmission line positioned on the first carrier surface and a first side carrier surface among the plurality of side carrier surfaces and configured to connect the first capacitive sensor and the second capacitive sensor.

4. The electronic device of claim 3, wherein the first transmission line is integrally connected to the first capacitive sensor and/or the second capacitive sensor.

5. The electronic device of claim 3, wherein the first transmission line is separably connected to the first capacitive sensor and/or the second capacitive sensor.

6. The electronic device of claim 3, wherein the first transmission line comprises a meandering pattern and/or an element having an inductance.

7. The electronic device of claim 3,
   wherein the first capacitive sensor and the second capacitive sensor each comprise a conductive patch, and
   wherein the first transmission line is connected to an edge of a conductive patch of the first capacitive sensor and an edge of a conductive patch of the second capacitive sensor.

8. The electronic device of claim 3,
   wherein the first capacitive sensor and the second capacitive sensor each comprise a conductive patch, and
   wherein the first transmission line is connected to a corner of a conductive patch of the first capacitive sensor and a corner of a conductive patch of the second capacitive sensor.

9. The electronic device of claim 3, further comprising:
   a second transmission line positioned on the first carrier surface and configured to connect the first capacitive sensor and the second capacitive sensor.

10. The electronic device of claim 9, wherein the second transmission line comprises a meandering pattern.

11. The electronic device of claim 3,
    wherein the first capacitive sensor comprises:
    a first longitudinal extension that is connected to the first transmission line and that extends in a first longitudinal direction, and
    a second longitudinal extension that is connected to the first longitudinal extension and that extends in a second longitudinal direction crossing the first longitudinal direction, and wherein the second capacitive sensor comprises:
- a third longitudinal extension that is connected to the first transmission line and that extends in a third longitudinal direction, and
- a fourth longitudinal extension that is connected to the third longitudinal extension, that extends in a fourth longitudinal direction crossing the third longitudinal direction and that is electrically connected to the second longitudinal extension.

12. The electronic device of claim 1, wherein the first capacitive sensor comprises:
- a first conductive extension that extends in a first diagonal direction; and
- a second conductive extension that extends in a second diagonal direction different from the first diagonal direction and meets the first conductive extension.

13. The electronic device of claim 1, wherein the first capacitive sensor comprises a conductive perimeter configured to form a closed loop by surrounding the patch.

14. The electronic device of claim 13, further comprising:
a conductive junction connected to the conductive perimeter.

15. The electronic device of claim 14, further comprising:
a conductive insert that is positioned on one of the plurality of side carrier surfaces and that is electrically connected to the conductive junction,
wherein the filler comprises:
- a first filler positioned on the conductive perimeter, and
- a second filler positioned between the first filler and the side surface.

16. The electronic device of claim 14, further comprising:
a conductive insert that is positioned on one of the plurality of side carrier surfaces and that is electrically connected to the conductive junction,
wherein the filler comprises:
- a first filler positioned between the first carrier surface and the conductive perimeter, and
- a second filler positioned between the conductive perimeter and the side surface.

17. An electronic device comprising:
a housing comprising a first surface, a second surface opposite to the first surface, and a side surface between the first surface and the second surface;
an antenna comprising:
- a carrier comprising a first carrier surface facing the side surface and a second carrier surface opposite to the first carrier surface,
- a first patch embedded between the first carrier surface and the second carrier surface in the carrier and configured to operate in a first frequency band, and
- a second patch embedded between the first patch and the first carrier surface in the carrier and configured to operate in a second frequency band different from the first frequency band; and
a filler between the first carrier surface and the side surface.

18. The electronic device of claim 17,
wherein the first patch is configured to receive an external input through the filler when the second patch operates in the second frequency band, and
wherein the second patch is configured to receive an external input through the filler when the first patch operates in the first frequency band.

19. An electronic device comprising:
a housing comprising a first surface, a second surface opposite to the first surface, and a side surface between the first surface and the second surface;
an antenna comprising:
- a carrier comprising a first carrier surface facing the side surface and a second carrier surface opposite to the first carrier surface, and
- a patch embedded between the first carrier surface and the second carrier surface in the carrier;
a capacitive sensor embedded between the patch and the first carrier surface in the carrier; and
a filler positioned between the first carrier surface and the side surface.

20. The electronic device of claim 19, wherein the capacitive sensor comprises a conductive perimeter configured to form a closed loop by surrounding the patch.

* * * * *